United States Patent
Fahrbach

(10) Patent No.: US 10,983,327 B2
(45) Date of Patent: Apr. 20, 2021

(54) LIGHT SHEET MICROSCOPE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/325,215

(22) PCT Filed: Aug. 16, 2017

(86) PCT No.: PCT/EP2017/070788
§ 371 (c)(1),
(2) Date: Feb. 13, 2019

(87) PCT Pub. No.: WO2018/033581
PCT Pub. Date: Feb. 22, 2018

(65) Prior Publication Data
US 2019/0204580 A1     Jul. 4, 2019

(30) Foreign Application Priority Data
Aug. 15, 2016  (LU) ............................ 93177

(51) Int. Cl.
*G02B 21/36* (2006.01)
*G02B 21/00* (2006.01)
*G01N 21/64* (2006.01)

(52) U.S. Cl.
CPC ....... *G02B 21/367* (2013.01); *G01N 21/6458* (2013.01); *G02B 21/0032* (2013.01); *G02B 21/0076* (2013.01)

(58) Field of Classification Search
CPC .............. G02B 21/367; G02B 21/0032; G02B 21/0076; G01N 21/6458
See application file for complete search history.

(56) References Cited

U.S. PATENT DOCUMENTS 5,039,214 A * 8/1991 Nagata ................. G02B 21/00
                                                     359/386
8,582,203 B2  11/2013 Dunsby
(Continued)

FOREIGN PATENT DOCUMENTS

DE    102007063274 A1    6/2009
DE    102009044983 A1    3/2011
(Continued)

OTHER PUBLICATIONS

Machine generated translation of JP 2015-218528 (priority document for US #2018/0313759) (Year: 2015).*
(Continued)

*Primary Examiner* — David E Harvey
(74) *Attorney, Agent, or Firm* — Leydig, Voit & Mayer, Ltd.

(57) ABSTRACT

A light sheet microscope includes an illuminator having a beam source which is designed to direct an illuminating beam propagating along an illumination axis onto a sample. A light-sheet generator is designed to generate a light-sheet-type illuminating light distribution illuminating the sample in one partial region. A detection unit has a detector that is designed to capture detection light originating from the section of the sample that is illuminated by the illuminating light distribution. An objective is provided for both the illuminator and the detection unit such that the objective is to be penetrated by the illuminating beam and the detection light. The illuminator has a beam modulator designed to modulate the illuminating beam perpendicular to the illumination axis.

23 Claims, 17 Drawing Sheets

(56) References Cited

U.S. PATENT DOCUMENTS

| | | |
|---|---|---|
| 8,619,237 B2 | 12/2013 | Hillman et al. |
| 10,054,780 B2 | 8/2018 | Lippert et al. |
| 2009/0195866 A1* | 8/2009 | Kawaski .............. G01N 21/6458 |
| | | 359/385 |
| 2010/0103962 A1* | 4/2010 | Ando .................... B23K 26/03 |
| | | 372/20 |
| 2011/0174986 A1* | 7/2011 | Kempe .............. G01N 21/6428 |
| | | 250/458.1 |
| 2012/0200693 A1 | 8/2012 | Lippert et al. |
| 2013/0335818 A1 | 12/2013 | Knebel et al. |
| 2013/0335819 A1* | 12/2013 | Cooper .................. G02B 21/06 |
| | | 359/389 |
| 2014/0139840 A1 | 5/2014 | Judkewitz et al. |
| 2015/0168732 A1* | 6/2015 | Singer ................ G02B 27/0988 |
| | | 348/79 |
| 2015/0226670 A1* | 8/2015 | Kleppe .................. G02B 21/26 |
| | | 359/385 |
| 2018/0313759 A1* | 11/2018 | Takiguchi .............. G01N 21/64 |
| 2019/0137744 A1* | 5/2019 | Takiguchi .......... G01N 21/6458 |
| 2019/0204580 A1* | 7/2019 | Fahrbach ........... G02B 21/0076 |
| 2019/0212536 A1* | 7/2019 | Fahrbach .............. G02B 21/367 |
| 2019/0250104 A1* | 8/2019 | Matoba ............. G02B 27/4233 |
| 2019/0278073 A1* | 9/2019 | Hillman .............. G02B 21/361 |
| 2020/0103637 A1* | 4/2020 | Hillman .................... G01J 3/36 |
| 2020/0249168 A1* | 8/2020 | Voleti ................ G02B 21/0072 |

FOREIGN PATENT DOCUMENTS

| | | |
|---|---|---|
| DE | 102011000835 B4 | 4/2012 |
| DE | 102012013163 A1 | 4/2014 |
| WO | WO 2010012980 A1 | 2/2010 |
| WO | WO 2012003259 A1 | 1/2012 |
| WO | WO 2015109323 A2 | 7/2015 |

OTHER PUBLICATIONS

Machine generated translation of JP 2015-218527 (priority document for US 2019/0137744) (Year: 2015).*

Makio Tokunaga, et al., "Highly inclined thin illumination enables clear single-molecule imaging in cells", Nature Methods, vol. 5, No. 2, Feb. 2008, pp. 159-161.

Sunil Kumar, et al., "High-speed 2D and 3D fluorescence microscopy of cardiac myocytes", Optics Express, vol. 19, No. 15, Jul. 18, 2011, pp. 13839-13847.

Tobias Breuninger, et al., "Lateral modulation boosts image quality in single plane illumination fluorescence microscopy", Optics Letters, vol. 32, No. 13, Jul. 1, 2007, pp. 1938-1940, XP001505587.

C. Dunsby, "Optically sectioned imaging by oblique plane microscopy", Optics Express, vol. 16, No. 25, Dec. 8, 2008, pp. 20306-20316.

Florian O. Fahrbach, et al., "Self-reconstructing sectioned Bessel beams offer submicron optical sectioning for large fields of view in light-sheet microscopy", Optics Express, vol. 21, No. 9, May 6, 2013, pp. 11425-11440.

Matthew B. Bouchard, et al., "Swept confocally-aligned planar excitation (SCAPE) microscopy for high-speed volumetric imaging of behaving organisms", Nature Photonics, vol. 9, Jan. 19, 2015, pp. 1-22, XP55427410A.

Tomas Cizmar, et al., "Tunable Bessel light modes: engineering the axial propagation", Optics Express, vol. 17, No. 18, Aug. 31, 2009, pp. 15558- 15570.

* cited by examiner

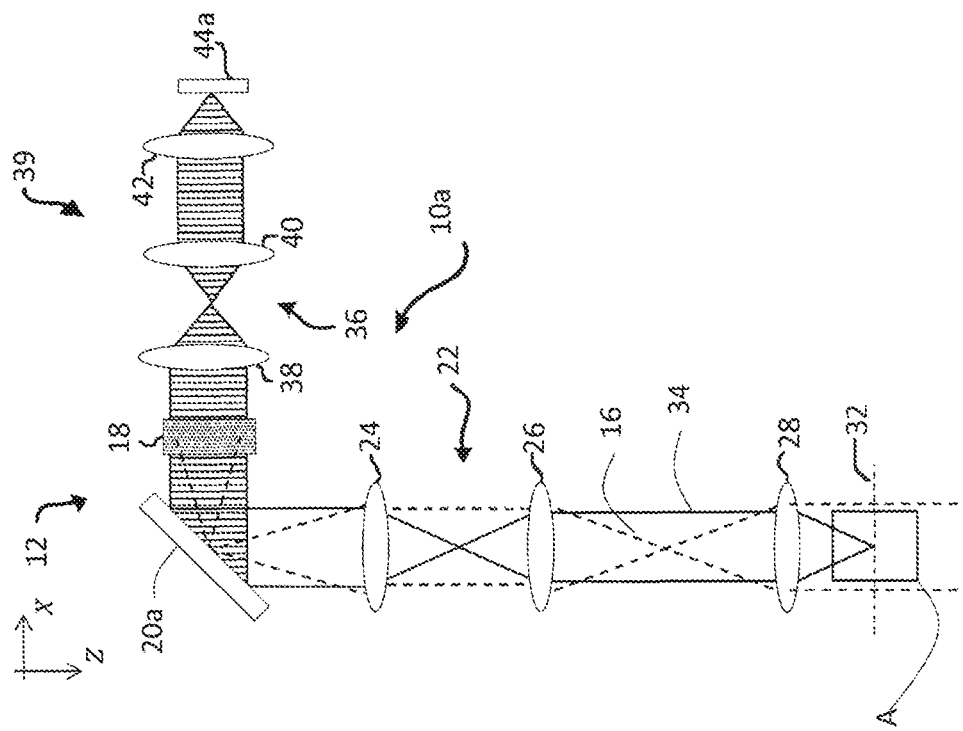
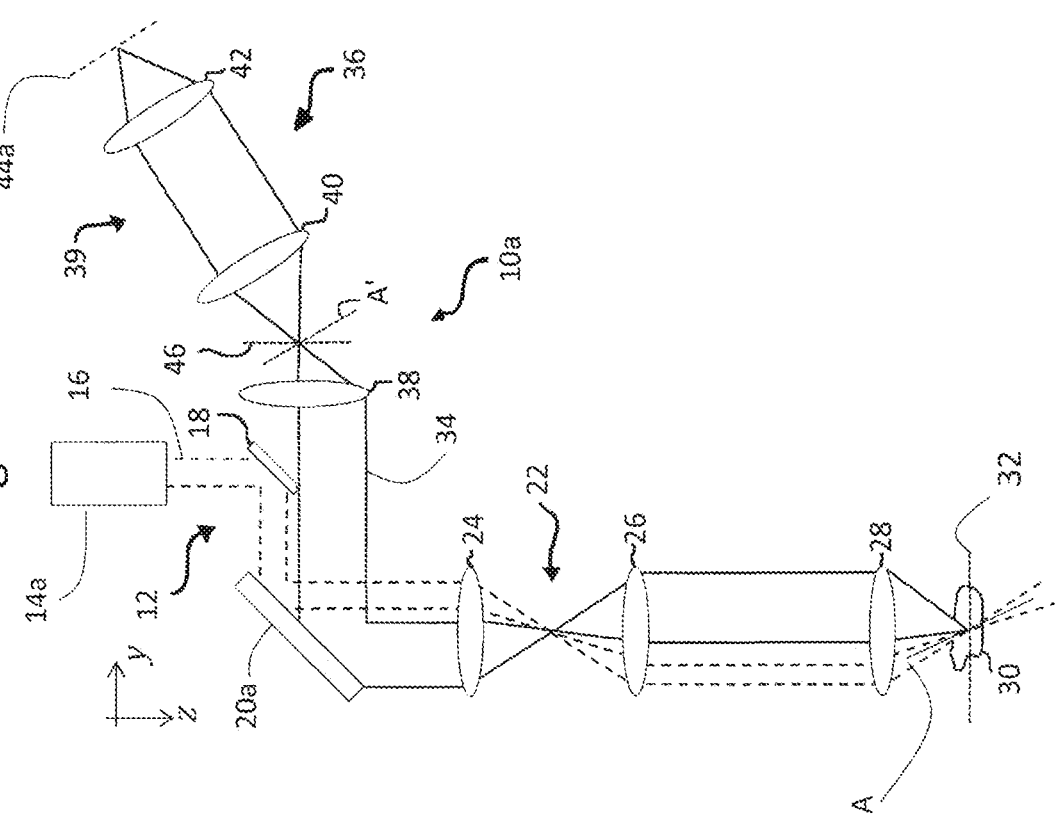

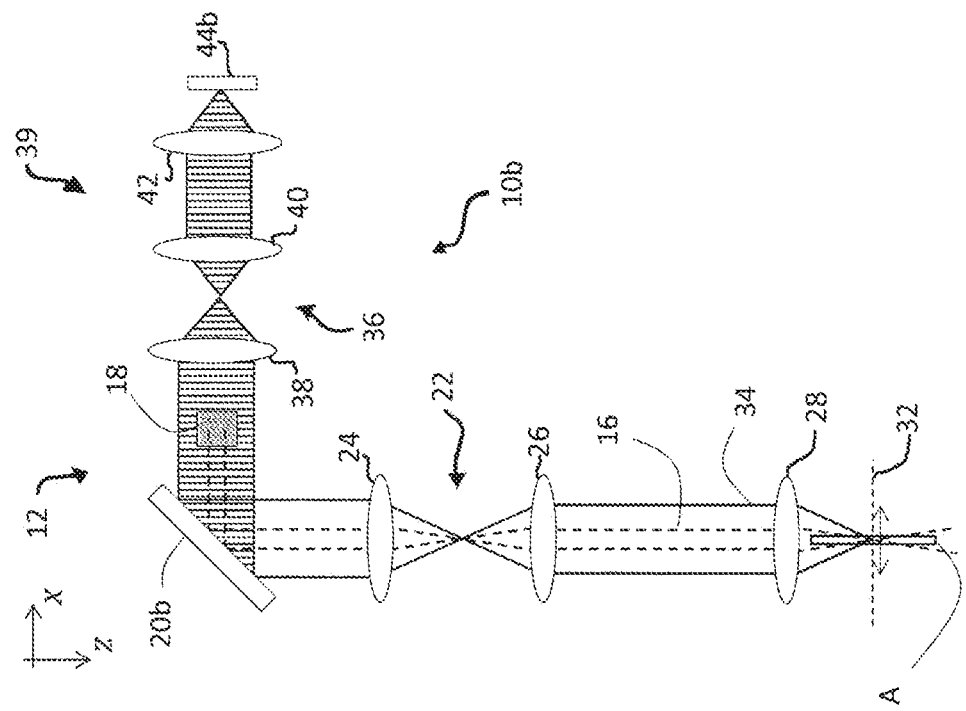
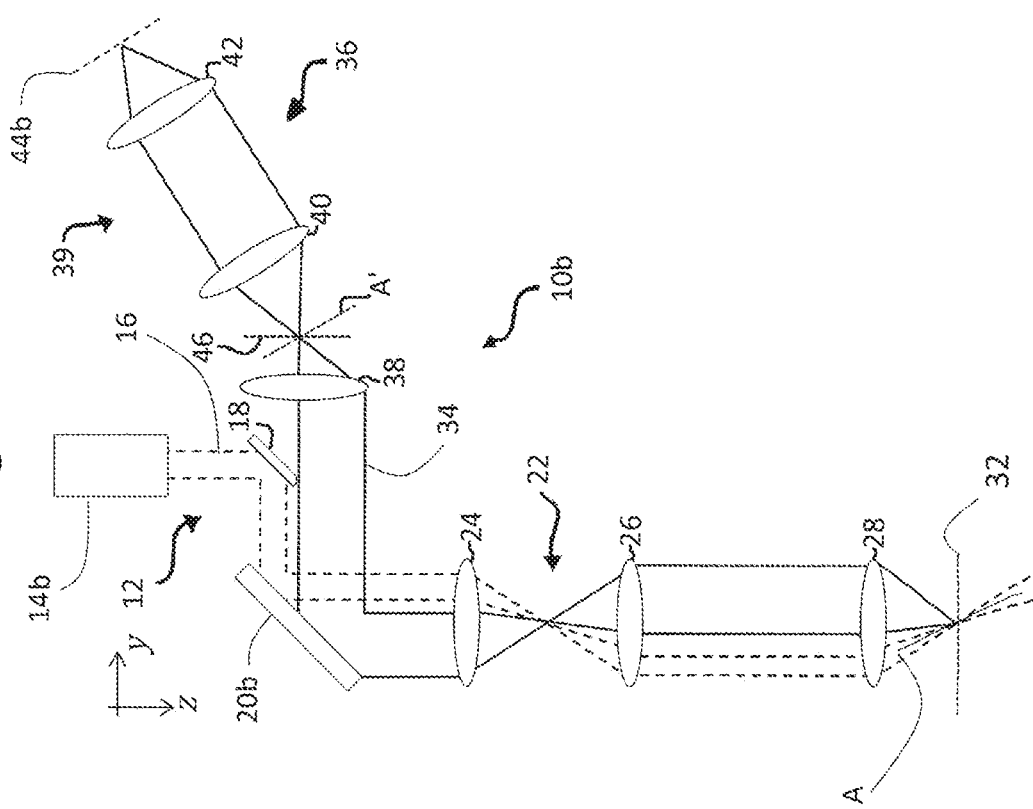

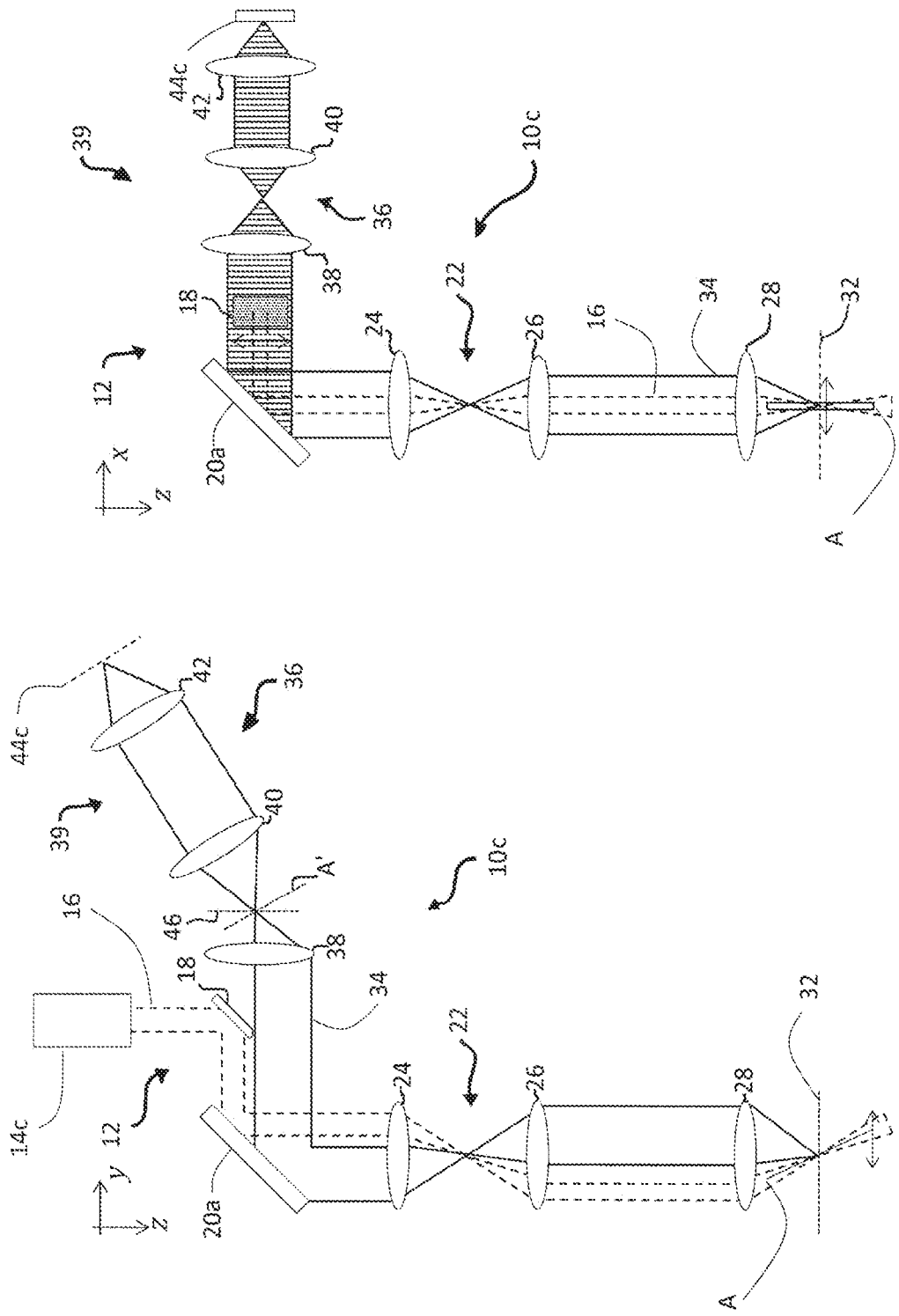

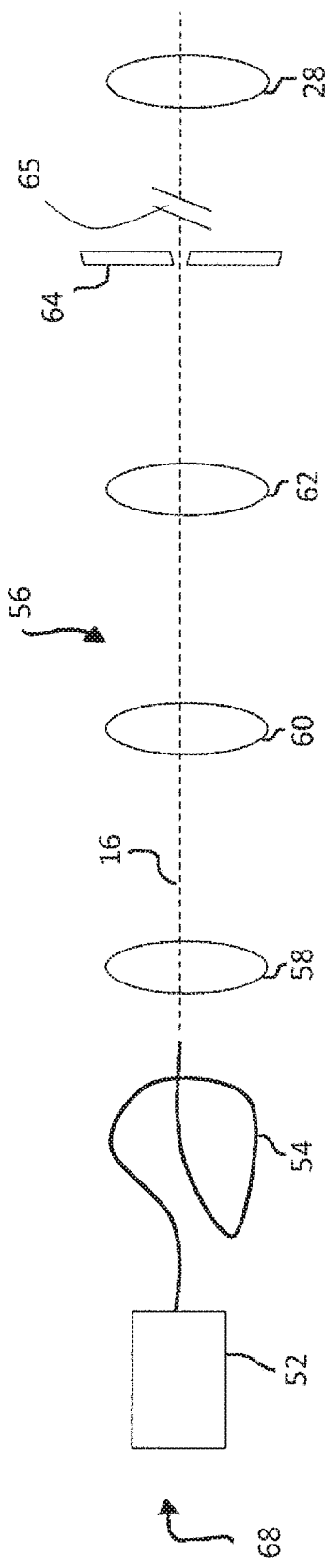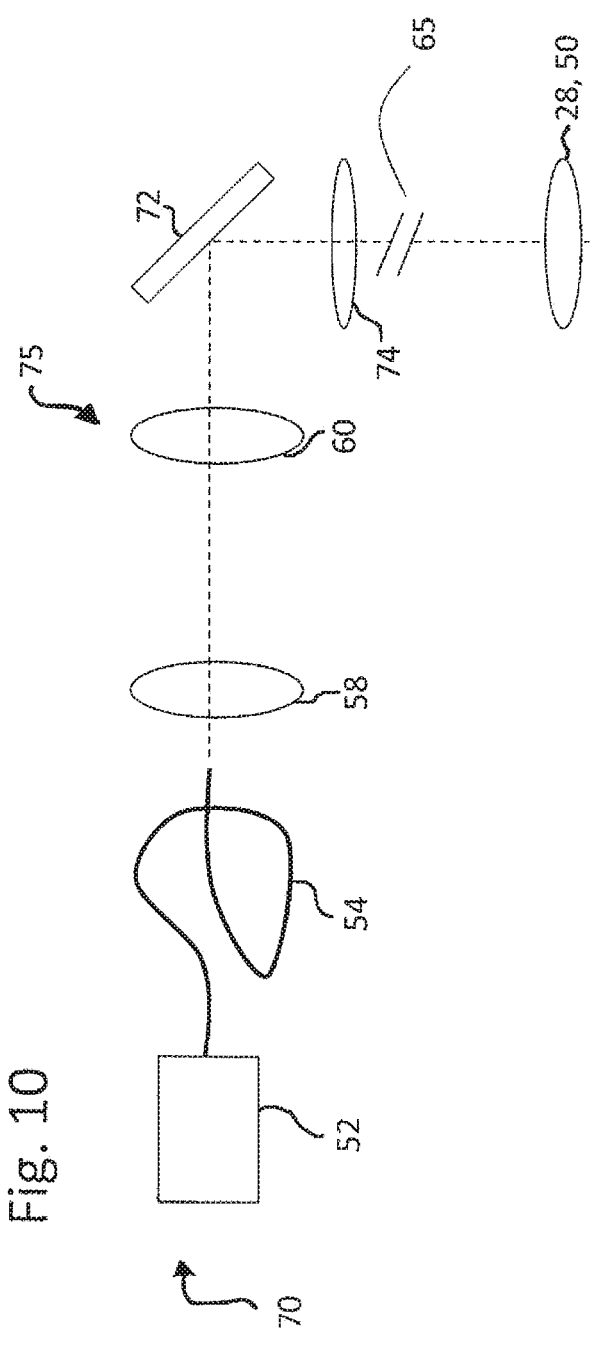

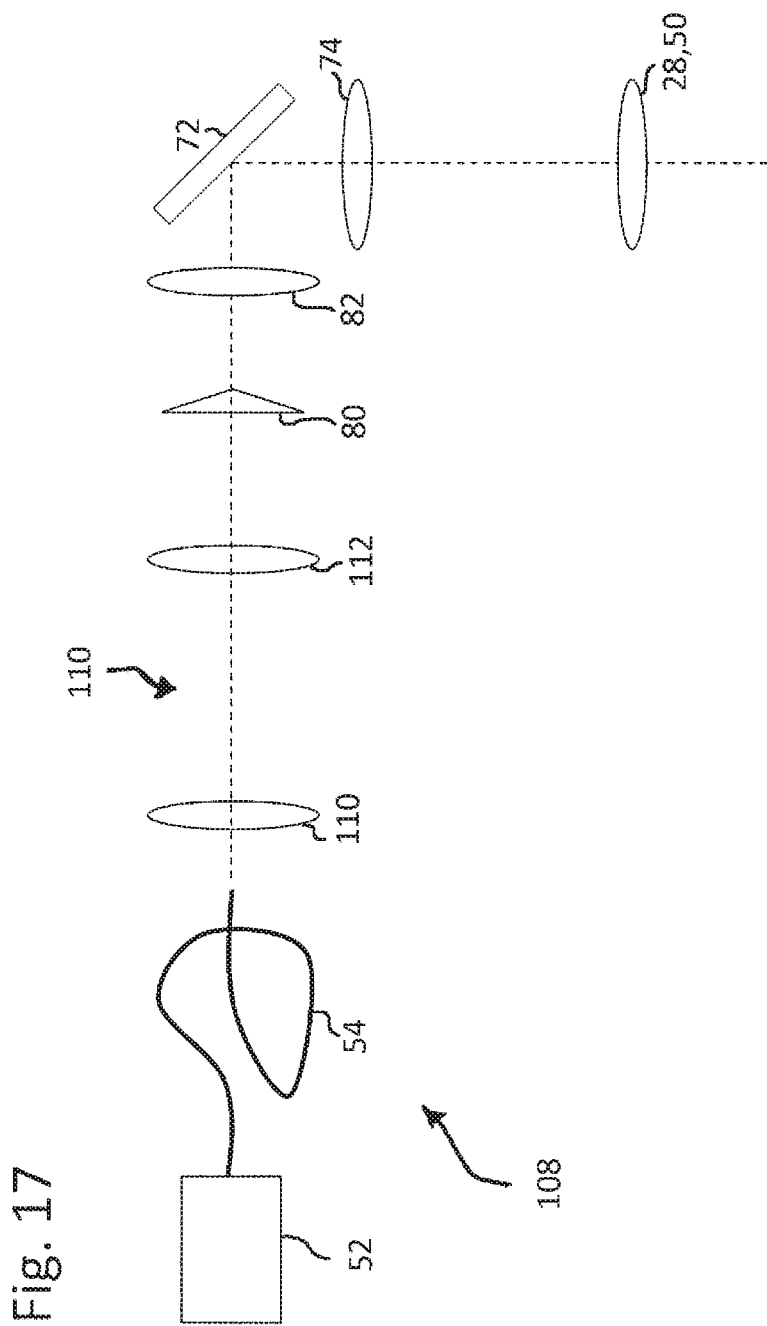

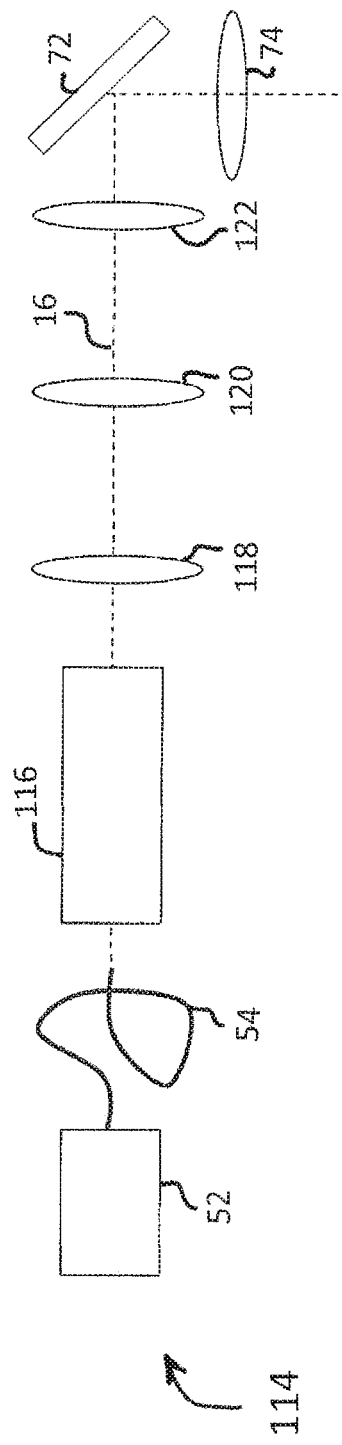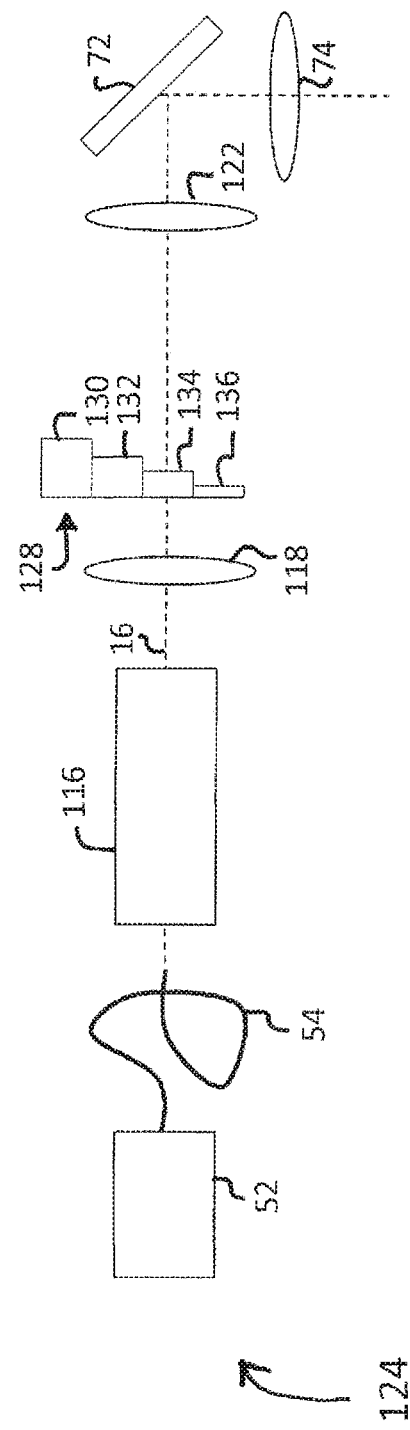

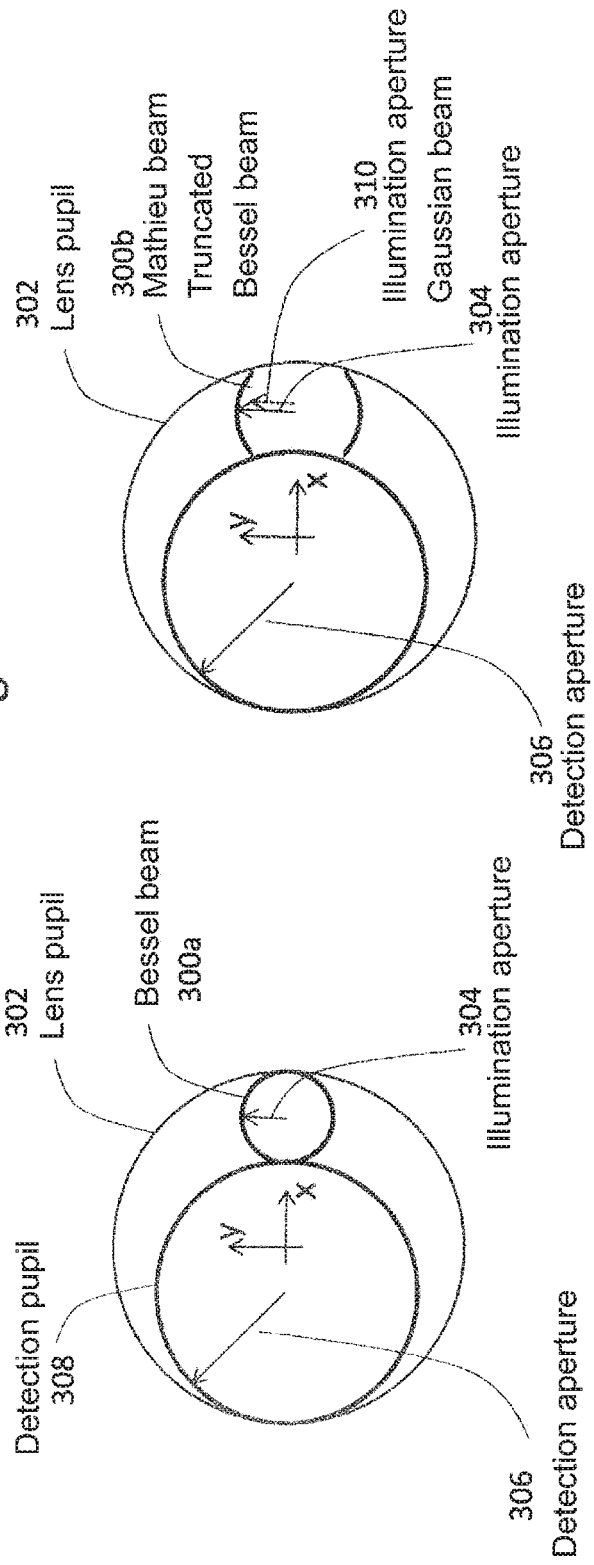

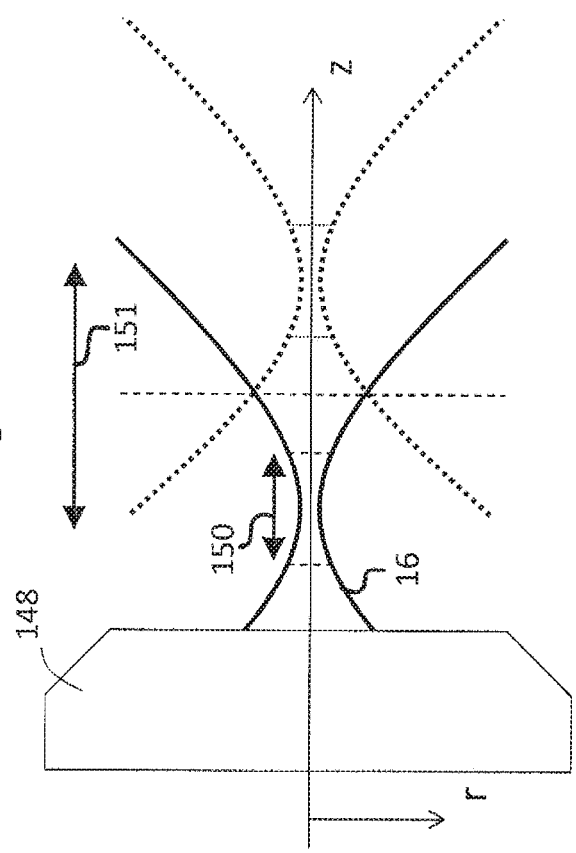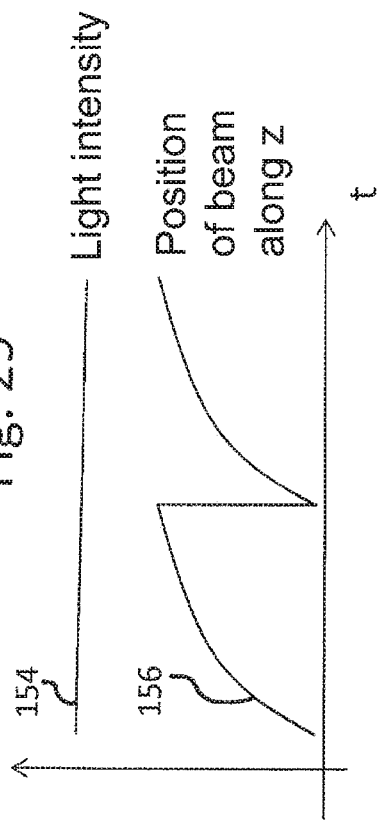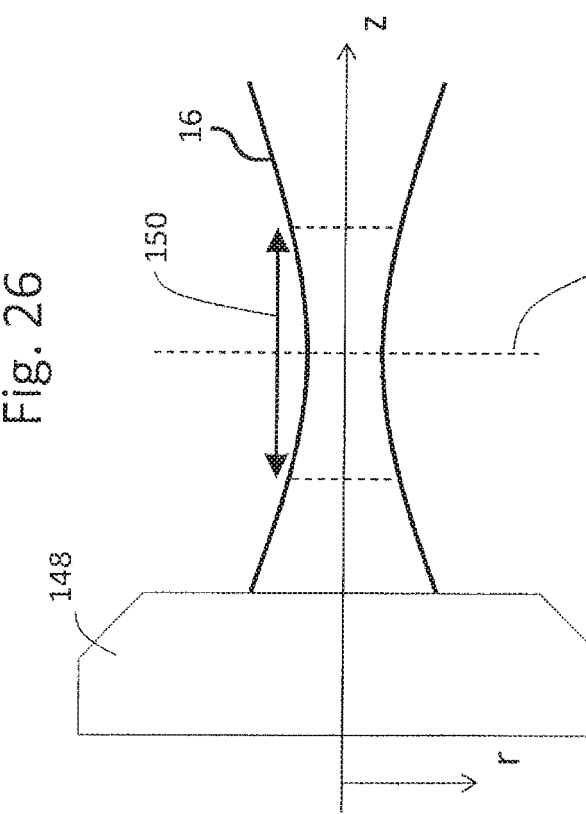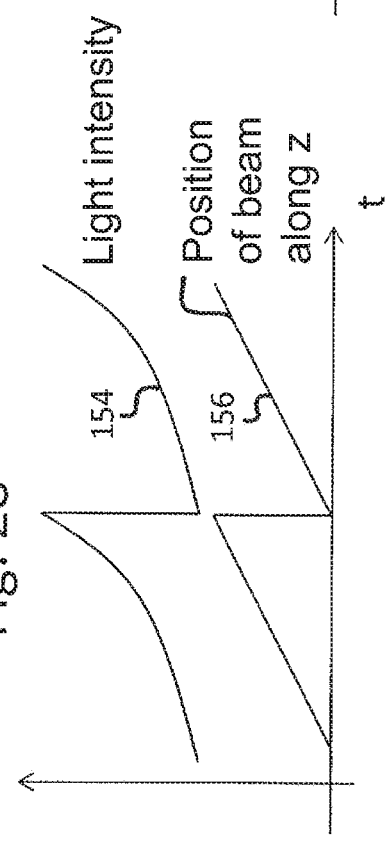
Fig. 26
Fig. 27
Fig. 28
Fig. 29

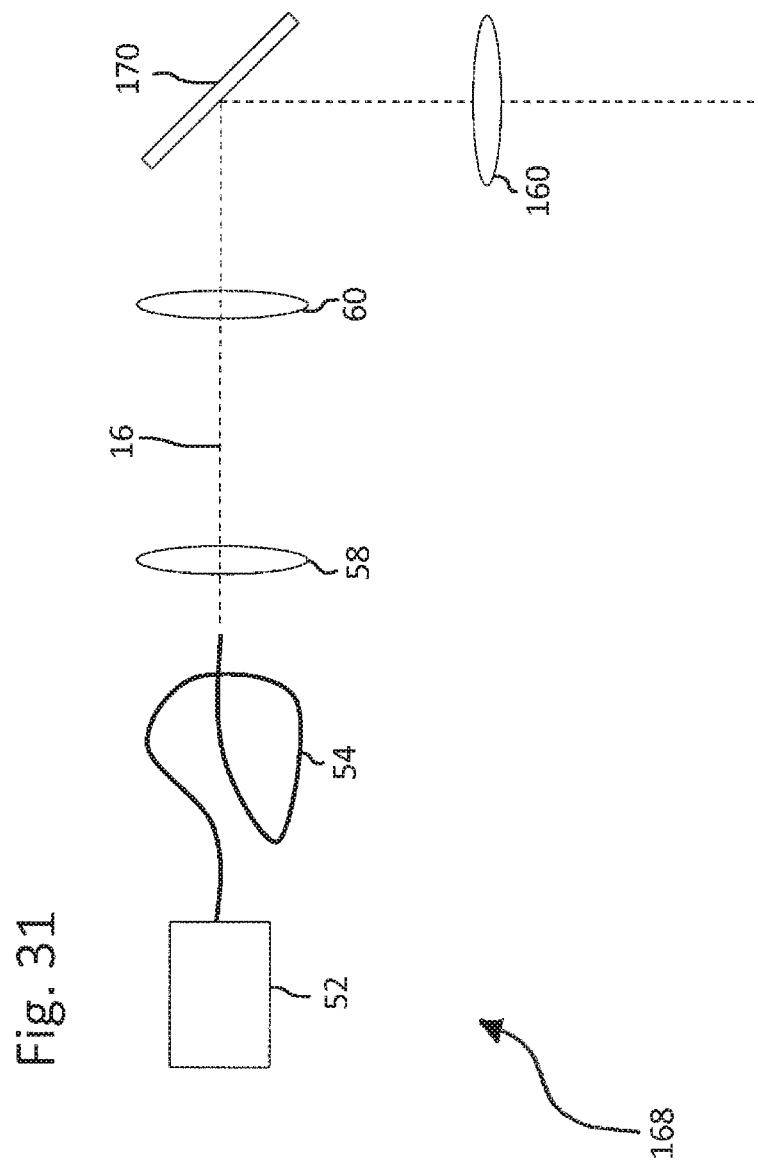

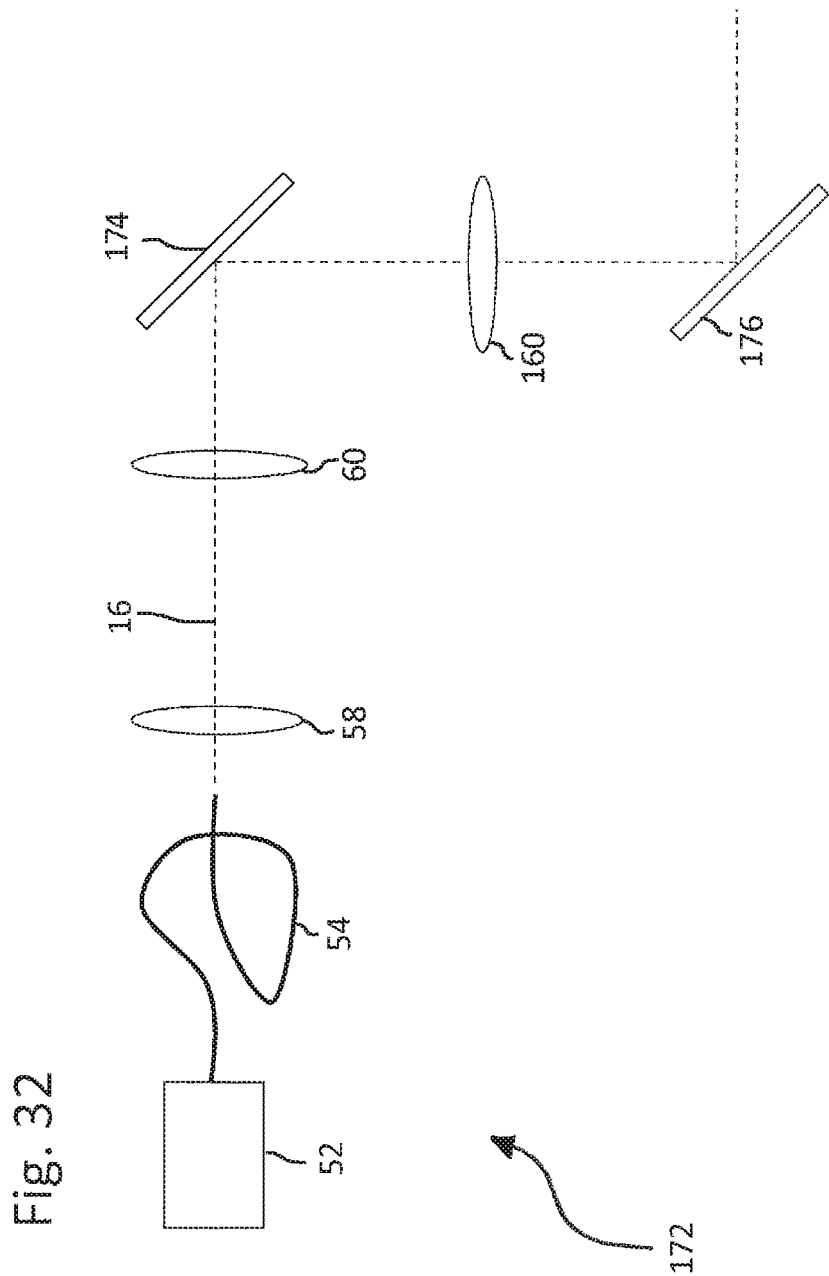

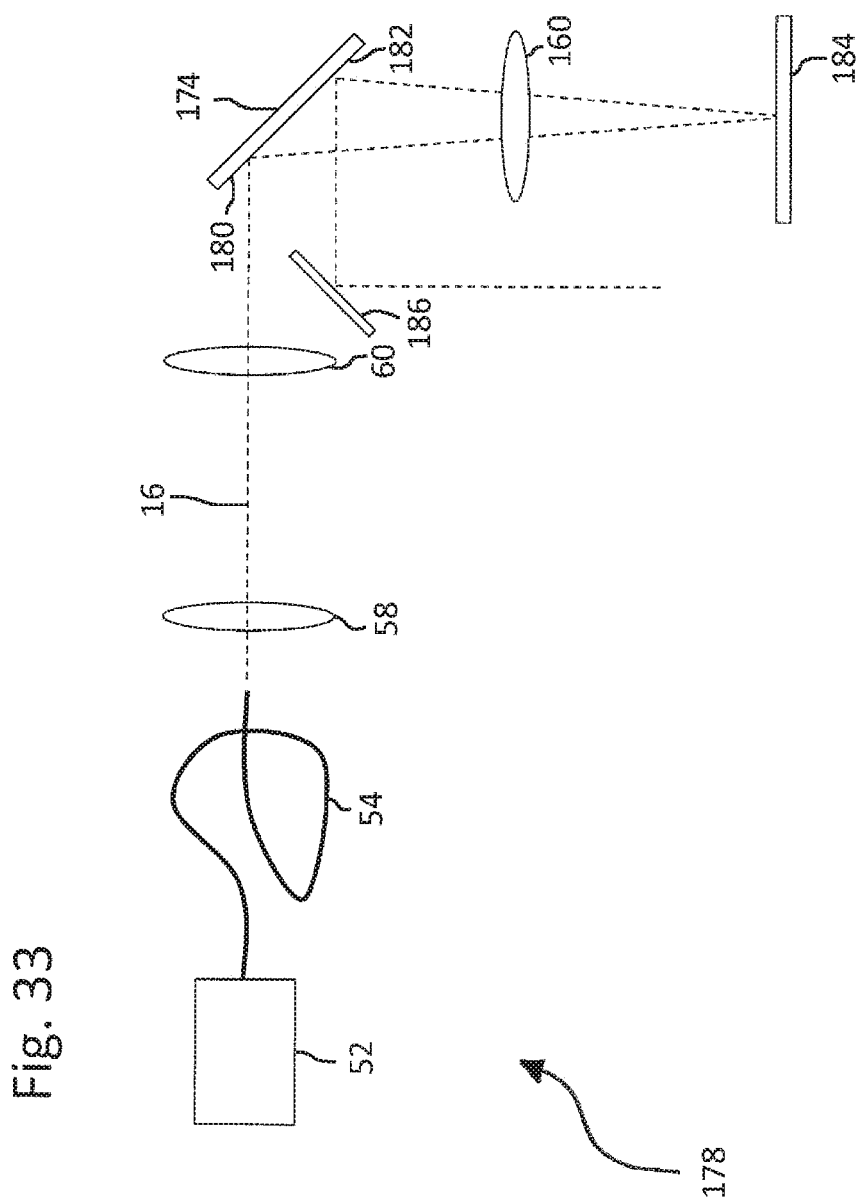

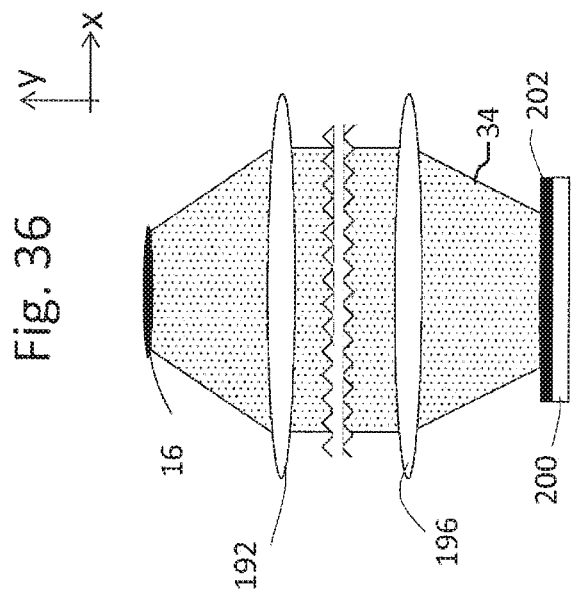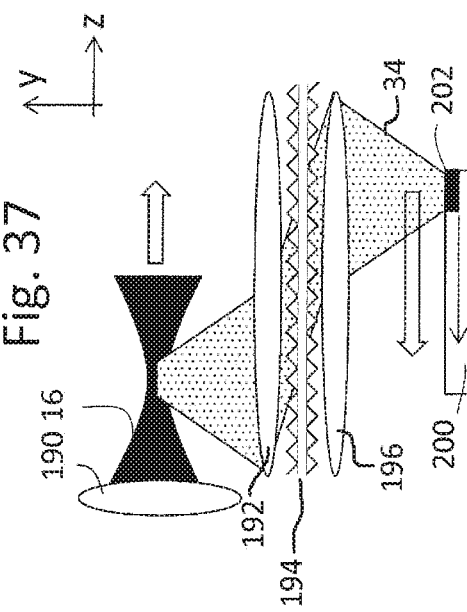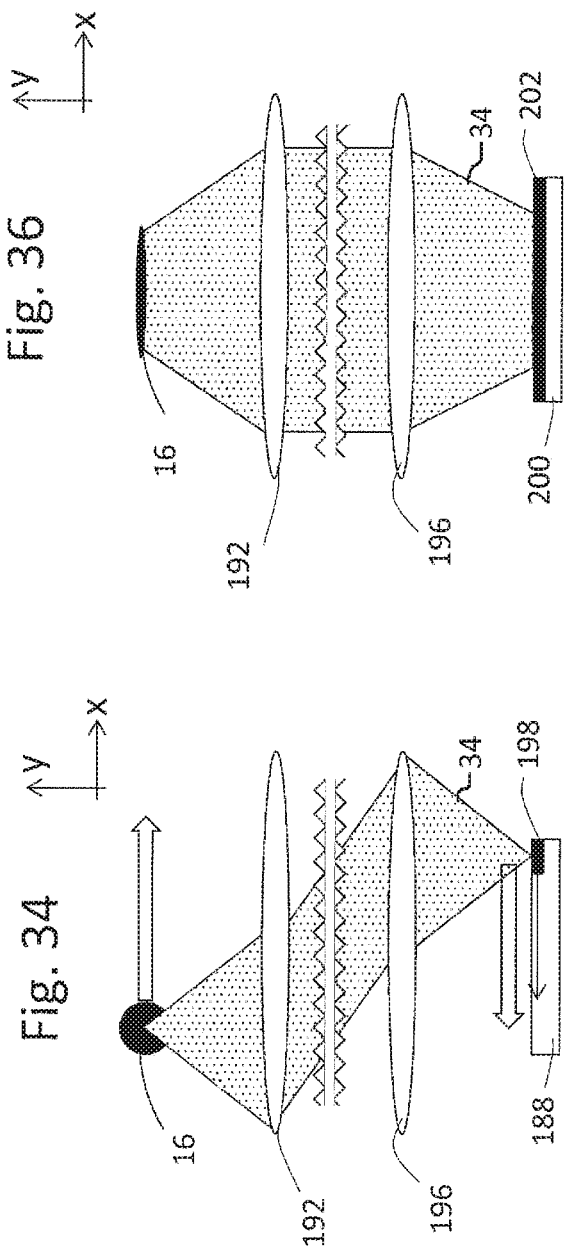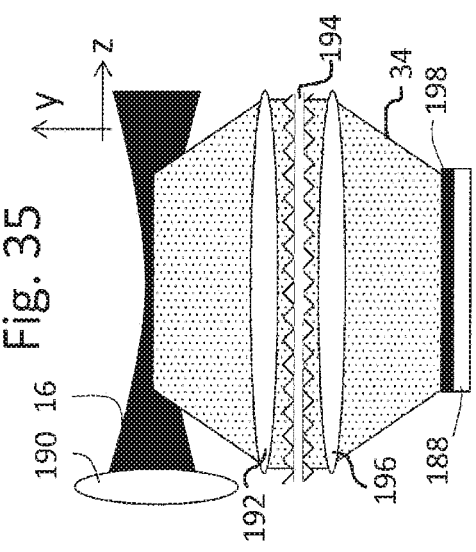

LIGHT SHEET MICROSCOPE

CROSS-REFERENCE TO PRIOR APPLICATIONS

This application is a U.S. National Stage Application under 35 U.S.C. § 371 of International Application No. PCT/EP2017/070788 filed on Aug. 16, 2017, and claims benefit to Luxembourgian Patent Application No. LU 93177 filed on Aug. 15, 2016. The International Application was published in German on Feb. 22, 2018, as WO 2018/033581 A1 under PCT Article 21(2).

FIELD

The invention relates to a light sheet microscope, comprising an illuminating unit having a beam source that is designed to direct an illuminating beam propagating along an illumination axis toward a sample, a light-sheet producing means, which is designed to produce a light-sheet-type illuminating light distribution that illuminates the sample in a partial region from the illuminating beam, a detection unit, which has a detector, which is designed to sense detection light, which originates from the partial region of the sample illuminated with the illuminating light distribution, and an objective, which is provided jointly for the illuminating unit and the detection unit and through which the illuminating beam and the detection light pass.

BACKGROUND

In particular in fluorescence microscopy, microscopy methods in which the sample is illuminated with a light distribution of plane or linear expansion have been used in the recent past. Examples of these are microscopy methods known under the names of SPIM (Single Plane Illumination Microscopy), OPM (Oblique Plane Microscopy), and SCAPE (Swept Confocally Aligned Planar Excitation). For example, in a SPIM microscope, an illumination light bundle, for instance, is focused and thus expanded only in one direction with the aid of a cylindrical lens, whereby the sample is illuminated with a light sheet or a light pane that illuminates only one sample plane within the sample. For illumination and detection, a SPIM microscope has two separate objectives on the sample side, the optical axes of which extend at right angles to one another. The sample plane to be imaged is perpendicular to the optical axis of the detection objective. The illumination of said sample plane occurs through the light sheet, which the illumination objective to the optical axis of the detection objective radiates at right angles into the sample.

In contrast, in the SCAPE method, a single sample-side objective is used for both illumination and detection. The illumination is performed with a light sheet positioned obliquely to the optical axis of the objective. As a result of this inclination of the light sheet, a SCAPE microscope conventionally has straightening optics interacting with the objective with partial optics that are obliquely aligned with respect to one another, and which ensure via an intermediate image that the sample region illuminated with the inclined light sheet is imaged onto the detector in a correct position and corrected optically to a considerable extent.

For more detailed explanations of the aforementioned SPIM, OPMs, and SCAPE method, we refer as examples to the publications Kumar, S. et al., High-speed 2D and 3D fluorescence microscopy of cardiac myocytes. Opt. Express 19, 13839 (2011); Dunsby, C., Optically sectioned imaging by oblique plane microscopy, Opt. Express 16, 20306-20316 (2008) and Bouchard, M. B. et al., Swept confocally-aligned planar excitation (SCAPE) microscopy for high speed volumetric imaging of behaving organisms, Nat. Photonics 9, 113-119 (2015) as well as to patent documents U.S. Pat. No. 8,582,203 B2 and U.S. Pat. No. 8,619,237 B2.

A related microscopy method which, however, does without straightening optics, is the so-called HILO method (Highly Inclined And Laminated Optical Sheet). For this, reference is made to Tokunaga, M., Imamoto, N. & Sakata Sogawa, K., Highly inclined thin illumination enables clear single molecule imaging in cells, Nat. Methods 5, 159-161 (2008).

In DE 10 2011 000 835 B4, the light sheet provided for oblique illumination of the sample is produced with the aid of a scanning unit which is located in a plane conjugated with the rear focal plane of the illumination objective. The fluorescent light to be detected is decoupled from the objective and the scanning unit.

Reference is further made to the prior art as described in WO 2015/109323 A2 which shows, among other elements, a microscope design in which a dichroitic mirror for separating the fluorescent light to be detected is arranged downstream of a scanning mirror in the light direction so that the fluorescent light is directly descanned from the scanning mirror. This design largely corresponds to the design of a point scanning confocal microscope. However, the difference between the two is first that the illuminating beam is weakly focused and directed obliquely into the sample. Second, the fluorescent light collected from the oblique line focus arranged against the focus plane of the objective is raised by means of straightening optics. This allows image information to be obtained along the illuminated line by means of a line sensor. Since the scanning mirror is used both for scanning the sample with the illuminating beam and for descanning the detected fluorescent light, a stationary detector can be used.

In conventional light sheet microscopy, the sample illumination is usually carried out by means of a Gaussian beam, i.e. by means of an illuminating beam that has an intensity profile in the cross section perpendicular to the illumination axis of a Gaussian curve, with the width of this Gaussian curve varying along the illumination axis. Such a Gaussian beam tapers down to its narrowest point which is called the focus, depth of field or waist, and then increases once more.

Due to its continuously decreasing intensity profile perpendicular to the illumination axis, a Gaussian beam is subject to certain restrictions concerning its use for sample illumination in light sheet microscopes. Mention should be made here primarily of the resolution achievable in the detection direction with this sample illumination. Furthermore, there are disadvantages for the scaling of the resulting cross-sectional views with the size of the field of view, comparably low entry depth into scattering media and even illumination of the sample.

There are different approaches suggesting alternative illumination methods, partly without using a Gaussian beam. For this purpose, reference is made by way of example to DE 10 2007 063 274 A1; Lanbach, F. O., Gurchenkov, V., Alessandri, K., Nassoy, P. & Rohrbach, A. Self-reconstructing sectioned Bessel beams offer submicron optical sectioning for large fields of view in light-sheet microscopy. Opt. Express 21, 11425 (2013); DE 10 2012 013 163 A1; Dholakia, T. Č. K. Tunable Bessel light modes: engineering the axial propagation. Opt. Express, OE 17, 15558-15570 (2009).

However, some of these procedures are very laborious, or can only be applied to light sheet microscopy up to a certain point. In particular there are currently no known methods for OPM and SCAPE applications that overcome the above-mentioned disadvantages of illumination by means of a Gaussian beam.

SUMMARY

In an embodiment, the present invention provides a light sheet microscope which includes an illuminator having a beam source which is designed to direct an illuminating beam propagating along an illumination axis onto a sample. A light-sheet generator is designed to generate a light-sheet-type illuminating light distribution illuminating the sample in one partial region. A detection unit has a detector that is designed to capture detection light originating from the section of the sample that is illuminated by the illuminating light distribution. An objective is provided for both the illuminator and the detection unit such that the objective is to be penetrated by the illuminating beam and the detection light. The illuminator has a beam modulator designed to modulate the illuminating beam perpendicular to the illumination axis.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 a first embodiment of a microscope, to which the invention can be applied, in a y-z sectional view;

FIG. 2 the microscope according to the first embodiment in a x-z sectional view;

FIG. 3 a second embodiment of a microscope, to which the invention can be applied, in a y-z sectional view;

FIG. 4 the microscope according to the second embodiment in a x-z sectional view;

FIG. 5 a third embodiment of a microscope, to which the invention can be applied, in a y-z sectional view;

FIG. 6 the microscope according to the third embodiment in a x-z sectional view;

FIG. 9 a beam source according to the invention to generate a light sheet;

FIG. 10 an alternative embodiment of a beam source to generate a light sheet;

FIG. 17 a beam source according to the invention for generating Mathieu beams;

FIG. 18 a beam source according to the invention for generating an illuminating beam having an axially displaceable focus depth area;

FIG. 19 an alternative beam source for generating an illuminating beam having an axially displaceable focus depth area;

FIG. 20 a pupil representation showing the lens pupil and the detection pupil using a Bessel beam;

FIG. 21 a pupil representation showing the lens pupil and detection pupil using a Mathieu beam or a trimmed Bessel beam;

FIG. 26 a schematic representation showing an axial depth of focus area of the illuminating beam;

FIG. 27 a schematic representation illustrating the displacement of the depth of focus area of the illuminating beam according to the invention;

FIG. 28 a schematic representation that illustrates the variation of the intensity of the illuminating beam depending on the position of the depth of focus area according to the invention;

FIG. 29 a schematic representation that illustrates the variation of the displacement speed of the depth of focus area of the illuminating beam depending on its position according to the invention;

FIG. 31 a beam source according to the invention for generating an illuminating beam with absorption-compensating beam profile;

FIG. 32 another beam source according to the invention for generating an illuminating beam with absorption-compensating beam profile;

FIG. 33 another beam source according to the invention for generating an illuminating beam with absorption-compensating beam profile;

FIG. 34 an embodiment according to the invention comprising a rolling shutter function flat panel detector in an x-y sectional view;

FIG. 35 the embodiment according to FIG. 34 in a y-z sectional view;

FIG. 36 another embodiment comprising a rolling shutter function flat panel detector in an x-y sectional view; and FIG. 37 the embodiment according to FIG. 36 in a y-z sectional view.

DETAILED DESCRIPTION

Figure 7:
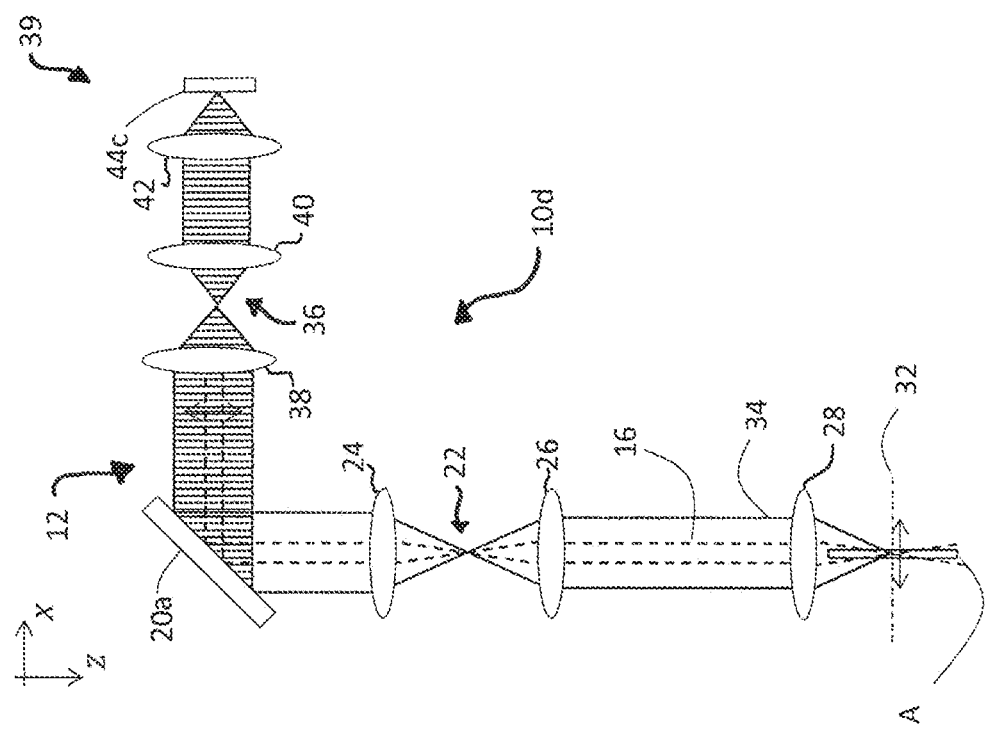
FIG. 7 a fourth embodiment of a microscope, to which the invention can be applied, in a y-z sectional view.

Embodiments of the invention provide a light sheet microscope as well as a method for the microscopic imaging of a sample that allow sample illumination that is especially improved with regard to the resolution in the detection direction.

The illuminating unit of the light sheet microscope according to an embodiment of the invention features a beam modulation means that is designed to modulate the illuminating beam perpendicular to the illumination axis, i.e. perpendicular to an axis defining the beam propagation direction. This modulation allows a targeted re-distribution of the illumination light in a departure from the usually available Gaussian profile and transverse to the illumination axis in such a way that the resolution in detection direction is improved. This applies in OPM and SCAPE applications in which, although a common objective is used for illumination and detection, the illumination axis and the detection axis are spatially separated. A targeted re-distribution of the illumination light, e.g. in such a way that the resulting illuminating light distribution is comparably thin in a direction that is transverse to the illumination axis then consequently has a correspondingly improved resolution in the direction of the detection axis.

In one preferred embodiment, the beam-modulating mean comprises a beam-shaping optic which is designed to shape the illuminating beam in such a way that its radial intensity profile has at least one profile section in at least one direction perpendicular to the illumination axis, said profile section increasing with increasing radial distance from the illumination axis. In contrast to a usual Gaussian profile which continuously decreases perpendicular to the illumination axis, the profile section which rises at a radial distance can be used here for the targeted light conversion in order to achieve the desired effects, in particular to increase the resolution along the detection axis.

In one particularly preferred embodiment, the beam shaping optics are designed to shape an increasing or decreasing phase onto the illuminating beam that is linearly proportional to the radial distance from the illumination axis. In particular, the beam-shaping optics are preferably designed to form at least one Bessel beam or at least one Mathieu beam from the illuminating beam.

A Bessel beam, which may, for example, be generated by means of an axicon, has the property of being non-bending and self-reconstructing in addition to the above-mentioned advantage of increasing the resolution. The latter means that a Bessel beam, when it is partially disturbed or blocked at a point along the illumination axis, for instance by a scattering center, recovers its shape in its further course. Thus, illumination with a Bessel beam in scattering and/or absorbing samples is a major advantage. This applies especially to OPM and SCAPE applications in which the illuminated sample level is tilted relative to the detected focus level, which means that the detection light that contributes to the resulting image is both from regions near the surface and from deeper regions of the sample. If the illuminating beam is substantially weakened with the increasing penetration depth into the sample due to scattering and/or absorption, there would in such a case be major differences in brightness across the image field. This is countered by using a Bessel beam that is self-reconstructing in case of scattering and/or absorption. Similarly, the (fluorescence) light originating from the sample and captured in the microscope objective is scattered and absorbed on its path through the sample. The result of those two effects substantially reduces the signal strength within an image for increasing illumination and detection side penetration depths. This requires sensors with high dynamics and makes automatic image analysis more difficult, since the image contrast varies very strongly within the image. The use of a Bessel beam has further advantages (in addition to the achievable higher resolution and better penetration depth). In the context of OPM and SCAPE, another advantage is in particular that a Bessel beam is not subject to any spherical aberration due to its narrow angular spectrum.

The use of a Mathieu beam is also advantageous. Like a Bessel beam, this is non-diffractive and has similar properties and thus similar advantages. However, it is well known that a Mathieu beam has a cross-sectional profile that deviates from the profile of a Bessel beam. For example, a Mathieu beam may be generated by illuminating an axicon with a cross-sectionally elliptical Gaussian beam.

The Bessel and Mathieu beams may be modulated in a simple manner in their axial profile, i.e. the intensity in a narrow strip along the optical axis, by introducing light to this beam section from a radial direction, i.e. from outside this strip. This is possible since these beams, measured at their depth of field, have a broad angular spectrum, in other words have contributions in the case of comparatively large radial components.

Of course, linear and non-linear excitation of fluorescence is always possible with the beams mentioned here.

In one further preferred embodiment, the beam-shaping optics contain an aperture arrangement which is designed to trim the beam cross-section of the illuminating beam. A Bessel beam in particular may be brought into a beam shape that is particularly advantageous for light sheet microscopy in this manner. Such a beam, which hereinafter is also referred to as a trimmed Bessel beam is usable particularly advantageously, especially in an OPM application, like a Mathieu beam. For example, a trimmed Bessel beam or a Mathieu beam can be placed closer to the rim of a lens pupil so that the overlap with the detection area is accordingly lower. As a result, a larger effective detection aperture or a larger effective illumination aperture can be used in this manner. A trimmed Bessel beam can be generated, for example, using an axicon and a downstream slit aperture.

The beam shaping optics preferably includes at least one spatial light modulator, SLM for short, that is designed to generate the radial intensity profile of the illuminating beam. This light modulator can be designed to modulate the intensity of the illuminating beam in order to generate the desired beam profile. However, it is also possible for the light modular to modulate the phase or the phase and intensity simultaneously. The light modulator can be realized, for example, in the form of a convex or concave axicon, a grid, a hologram or a deformable mirror. It may be implemented as a ferroelectric SLM or as an LCoS SLM. It is also possible to utilize a combination of several such elements as a light modulator.

In one preferred embodiment, the beam-modulating mean is additionally designed to modulate the illuminating beam along the illumination axis. For example, this makes it possible to influence the axial beam profile in such a way that differences in brightness due to scattering and/or absorption within the image field are avoided. For example, the axial beam profile may be modulated in such a manner that, within the image field there is at least one first area in which the intensity increases, and at least one second area in which the intensity decreases. This can be used, for example, for sample protection or for illumination of diverse target areas.

In particular, it is advantageous if the beam-modulating mean is designed to modulate the illuminating beam along the illumination axis such that the exposure of the partial area of the specimen illuminated with the illuminating light distribution does not decrease along the illumination axis. This allows compensation for a weakening of the illuminating beam caused by scattering and/or absorption with increasing penetration depth into the sample.

The beam-modulating mean is preferably designed to shift a focus depth range or focus of the illuminating beam along the illumination axis. In that the depth of field of the illuminating beam can be shifted along the illumination axis, the intensity and/or the exposure duration for each position on the illumination axis can be adjusted in such a way that the sample is illuminated with the desired amount of light in this position.

The beam-modulating mean preferably has an illumination objective that can be shifted along the illumination axis. In this embodiment, the displacement of the focus depth range of the illuminating beam is thus realized via an optical component arranged outside the beam source.

In one alternative embodiment, the means of modulating the beam includes a tunable lens included in the beam source for shifting the depth of field of the illuminating beam. By means of such a tunable lens whose optical effect can be adjusted variably, it is particularly easy to influence the illuminating beam in such a way that its depth of focus area is moved along the illumination axis.

In one further alternative embodiment, the beam-modulation mean has an optical element contained in the beam source for influencing the optical path length of the illuminating beam. This optical element comprises, for example, several transparent blocks that can optionally be introduced into a beam path of the illuminating beam, said blocks featuring various thicknesses along the illumination axis. The optical element may be executed, for example, as a disk that is movable at right angles to the illumination axis by means of a suitable drive, with the transparent blocks arranged on said disk in such a way that optionally one of those blocks is introduced into the beam path of the illuminating beam if the disk is moved perpendicular to the illumination axis. In another embodiment, the transparent blocks changing the path length of the illuminating beam can also be arranged on a disk which can be rotated about an axis of rotation parallel to the illumination axis.

In one particularly preferred embodiment, the beam-modulation mean is designed to modulate the intensity of the illuminating beam depending on the position of the depth of focus area along the illumination axis. For this purpose, for example, the laser light source generating the illuminating beam is correspondingly controlled synchronously with the displacement of the focus depth area.

In one embodiment in which the displacement of the depth of focus area is accompanied by the illuminating beam penetrating increasingly deeper into the sample, the beam-modulation mean is designed such that it increases the intensity of the illuminating beam as the penetration depth of the depth of focus area into the sample increases.

In particular, the beam-modulation mean may be executed in such a way that it increases the intensity of the illuminating beam near the axis with increasing penetration depth of the depth of focus area into the sample. Attenuation of the illuminating beam due to scattering and/or absorption can thus be compensated in a particularly simple manner. The above-mentioned intensity close to the axis corresponds to the performance that results in case of integration of the intensity across a spatially limited radial area around the illumination axis and/or the light propagation axis.

Additionally or alternatively, the beam-modulation mean, can also be designed such that it varies the displacement speed of the focus depth area of the illuminating beam depending on its position along the illumination axis. This variation in the displacement speed corresponds to a variation in the exposure time at the location of the sample region to be imaged.

In particular, the beam-modulation mean is preferably designed to decrease the displacement speed of the depth of focus area of the illuminating beam with increasing penetration depth into the sample in order to increase the exposure time accordingly.

In one special embodiment, the beam source has anamorphotic optics as the mean of light-sheet production. Such anamorphotic optics that may, for example, be executed as a cylinder lens, broaden the illuminating beam only in one of the two directions perpendicular to the illumination axis. In this embodiment, the light sheet is accordingly produced statically.

In one alternative embodiment, the beam source has a first sensing element as the light-sheet producing mean, wherein this first sensing element is designed to shift the illuminating beam along a first scanning axis. The light sheet is constructed dynamically by this movement of the illuminating beam.

Another preferred embodiment comprises a second sensing element which is provided jointly for the illuminating unit and the detection unit and is designed to move the illuminating beam along a second scanning axis which is perpendicular to the aforementioned first scanning axis. This second sensing element thus acts both on the illuminating beam and on the detection light. The latter is thereby descanned along the second scanning axis. This means that by feeding back the detection light to the second sensing element, the scanning movement conveyed to the illuminating beam by the sensing element is canceled with regard to the detection light in the sense of a counter effect, which subsequently ensures that the detection light can be captured by means of a stationary detector.

In the embodiments explained above, in which the detection light is not descanned along the first scanning axis, the detector is preferably embodied as a flat panel detector.

In one particularly preferred embodiment, the flat panel detector has a plurality of sensor elements that can be controlled in such a way that at a given time there is always just a part of the sensing elements that are switched to active in the way of a movable, preferably strip-shaped aperture. In this embodiment, the flat panel detector is therefore provided with a rolling shutter function. It can accordingly be used like a line sensor moved along a scanning axis.

Another alternative embodiment has a scanning unit which is jointly provided for the illuminating unit and the detection unit and is designed to move the illuminating beam along a first scanning axis and along a second scanning axis which is perpendicular to the first scanning axis. This embodiment will scan the detection light along both scanning axes. In this case, the scanning unit can be formed from two separate sensing elements, one of which provides for scanning along the first scanning axis and a second for scanning along the second scanning axis. However, it is also possible to provide only a single sensing element that performs both scanning movements.

The aforementioned sensing elements can each be embodied as galvanometer mirrors or as micro-electromechanical mirrors (MEMS). It is also possible to utilize an acousto-optical deflector (AOD). Depending on the application, said sensing elements are then used as 1D scanners or 2D scanners.

The beam source preferably contains a light source which emits suitable laser light depending on the application, e.g.

pulsed laser light, broadband laser light or light which is especially suitable for non-linear fluorescence excitation.

In the following, various embodiment of a light sheet microscope the beam modulation according to the invention can be applied to will be described with relation to FIGS. 1 to 8. Common to these different embodiments is that they each have a joint objective for illumination and detection, i.e. a lens through which both the fluorescence-exciting illumination light and the detection light represented by the triggered fluorescence radiation are guided. Those embodiments therefore function like a SCAPE or an OPM microscope.

FIGS. 1 and 2 show a light sheet microscope 10a as a first embodiment. FIGS. 1 and 2 refer to an orthogonal coordinate system with the axes x, y and z, wherein FIG. 1 shows a sectional view on the y-z plane and FIG. 2 a sectional view on the x-z plane.

The light sheet microscope 10a has an illuminating unit 12 with a beam source 14a which is designed to emit an illuminating beam 16. In this embodiment, the beam source 14a includes an anamorphic lens, such as a cylindrical lens, not explicitly shown in FIGS. 1 and 2, which shapes the illuminating beam 16 into a light-sheet-type illuminating light distribution, hereinafter simply referred to as a light sheet. Upon exiting the beam source 14a, the light sheet forms a flat light distribution oriented parallel to the y z plane. The technical implementation of the beam source 14a according to the invention as shown in FIGS. 1 and 2 (as well as the other beam sources according to FIGS. 3 to 8) is described in detail below on the basis of specimen embodiments with reference to FIGS. 9 to 37.

The beam source 14a emits the illuminating beam 16 onto a deflection mirror 18 which reflects the illuminating beam 16 in the direction of a 1D scanning mirror 20a. The 1D scanning mirror 20a is, for example, executed as a galvanometer mirror or a MEMS mirror and can be tilted around the x axis that runs perpendicular to the drawing plane in FIG. 1 by means of a drive. This tilting lets the 1D scanning mirror 20a displace the illuminating beam 16 in a direction that is parallel to the y axis. The 1D scanning mirror 20a is therefore referred to hereinafter as y scanning mirror.

They scanning mirror 20a reflects the illuminating beam 16 toward optics 22 composed of a scanning lens 24 and a tube lens 26 and forming a telescope. The optics 22 direct the illuminating beam 16 onto an objective 28 which then illuminates a sample 30 with the illuminating beam 16. The sample 30 is shown only in FIG. 1 to simplify the representation.

They scanning FIG. 20a is arranged in the course of the illuminating beam in such a way that it is located on a plane that is conjugated with respect to a rear focus level of the objective 28. They scanning mirror 20a, the optics 22 and the objective 28 thus form a telecentric system. The telescope comprising the lenses 24 and 26 is not absolutely necessary if the objective 28 is structurally designed such that the scanning mirror 20a can be placed directly in its pupil.

As shown in FIG. 1, the illuminating beam 16 strikes the y scanning mirror 20a in such a way that it is irradiated into the objective 28 along the y axis. The illuminating beam 16 therefore only illuminates the partial area of the entry pupil of the objective 28 that is off center, thus propagating within the sample 30 with a tilt relative to the optical axis of the objective 28. The illuminating beam 16, which forms the light sheet and is thus flat, propagates in the sample volume along an illumination plane A and excites fluorescence there. The illumination plane A, which defines the area illuminated in the sample, is spanned by the illumination axis, i.e. the direction of propagation of the illuminating beam 16, and the x axis (cf. FIG. 2). In FIGS. 1 and 2, the reference symbol 32 refers to the focus plane of the objective 28 on the sample side.

By tilting the y scanning mirror 20a around the x axis, the illumination plane A that is tilted against the optical axis can be shifted parallel to the y axis to receive image stacks within the sample 30.

The fluorescence radiation triggered by the illuminating beam 16, hereinafter referred to as detection light 34, again enters the objective 28 which accordingly functions both as an illumination objective and as a detection objective. The detection light 34 strikes the y scanning mirror 20a after penetrating the optics 22, with said mirror reflecting the detection light 34 in such a way that it passes the deflection mirror 18 and reaches the straightening optics 36. The straightening optics 36 contain two additional objectives 38 and 40 and a tube lens 42 with a flat panel detector 44a arranged downstream. By returning to the y scanning mirror 20a the detection light 34 is descanned in the direction of the y axis. This means that the scanning movement, which is transmitted to the illuminating beam 16 by they scanning mirror 20a and through which the illumination plane A is likewise moved through the sample 30, is canceled by the return of the detection light 34 to the y scanning mirror 20a in the sense of a counter effect. As a result, the illumination plane A is always imaged in a stationary manner on the surface detector 44a. Accordingly, the image capturing is effected level by level, i.e. all the pixels of the flat panel detector 44a are illuminated simultaneously. The aforementioned components 20a, 22, 28, 36 and 44a form a detection unit generally designated as 39.

The straightening optics 36 function to image the illumination plane A by way of an intermediate image onto a stationary plane A'. The plane A' is tilted with reference to a plane 46 that is optically conjugated to the focus plane 32.

As shown in FIGS. 1 and 2, the two objectives 38 and 40 of the straightening optics 36 are arranged obliquely to one another. This oblique position of the objectives 38 and 40 causes the plane A' to be imaged on the flat panel detector 44 in the correct position. As explained above, the descanning effect of they scanning mirror 20a additionally ensures that the illumination plane A is imaged in a stationary manner on the flat panel detector 44 via the stationary intermediate image A'.

It should be noted at this point that the representation of the detection beam course in FIG. 2 showing the x-z sectional view is greatly simplified. Actually, the part of the detection beam course that runs between the y scanning mirror 20a and the objective 38 is perpendicular to the drawing plane in FIG. 2 while the part of the detection beam course following the former part in the direction of the flat panel detector 44 runs obliquely to the drawing plane of FIG. 2.

In FIGS. 3 and 4, a y-z sectional view and/or an x-z section view are accordingly used to illustrate a light sheet microscope 10b that represents a modification according to the invention of the embodiment shown in FIGS. 1 and 2.

The light sheet microscope 10b is modified relative to the microscope 10a shown in FIGS. 1 and 2 in such a manner that the light-sheet-type illuminating light distribution that is a parallel, flat light distribution with regard to the x-z plane before entering into the objective 28, is not generated by means of anamorphotic optics arranged in the beam source, but instead by means of a scanning mirror that moves the illuminating beam 16 in one direction parallel to the x axis and thus practically creates a virtual light sheet. In comparison with the embodiment shown in FIGS. 1 and 2, the aforementioned modification in the light sheet microscope 10b according to FIGS. 3 and 4 is realized in that the beam source 14a is replaced by a modified beam source 14b, the y scanning mirror 20a by a 2D scanning mirror 20b and the flat panel detector 44a by a line detector 44b. Incidentally, the functional components of the light sheet microscope 10b coincide with those of the microscope 10a described above. These function components are equipped with the reference signs used in FIGS. 1 and 2 and will not be described again below. The same applies to any other figure that refers back to figures described before.

The modified beam source 14b does not include anamorphic optics for light sheet generation. Instead, the light sheet is produced by the 2D scanning mirror 20b in the light sheet microscope 10b. It can be tilted both around the x axis and they axis and is referred to henceforth as xy scanning mirror. The tilting of the XY scanning mirror 20b about the y axis serves to construct the light sheet on the x-z plane. To this extent, the xy scanning mirror 20b shown in FIGS. 3 and 4 assumes the function which the anamorphotic optics contained in the beam source 14a in the light sheet microscope 10a according to FIGS. 1 and 2 perform. In contrast, tilting the xy scanning mirror 20b about the x axis again causes a displacement of the illuminating beam 16 along they axis. This displacement, as used in the embodiment according to FIGS. 1 and 2, is also used in the light sheet microscope 10b to move the illumination plane A through the sample 30 and thus allow a recording of image stacks.

By returning the detection light from the sample to the xy scanning mirror 20b, the detection light 34 is also descanned in the light sheet microscope 10b. In contrast to the light sheet microscope 10a in which the detection light 34 is only scanned in they axis direction, in the embodiment shown in FIGS. 3 and 4 the descanning takes place both in the direction of they axis and in the direction of the x axis. Accordingly, in the light sheet microscope 10b, the flat panel detector 44a shown in FIGS. 1 and 2 is replaced with a line detector 44b. Thus, in the light sheet microscope 10b, the image recording takes place by confocal line detection.

The line detector 44b may comprise more than one line in this, especially if it comprises a time delay integration (TDI) function that shifts and adds the signal of the pixel cells synchronously with the image moved relatively to the sensor in order to avoid smearing artefacts.

FIGS. 5 and 6 show a light sheet microscope 10c as a further embodiment in a y-z sectional view and x-z sectional view, respectively. Compared to the light sheet microscope 10a depicted in FIGS. 1 and 2, the modifications according to FIGS. 5 and 6 has been realized by replacing the beam source 14a by a modified beam source 14c and the flat panel detector 44a by a modified flat panel detector 44c.

Whereas for the light sheet microscope 10a, the beam source 14a has anamorphotic optics for generating the light sheet lying parallel to the x-z plane, the modified beam source 14c of the light sheet microscope 10c has an x scanning mirror and can be tilted about the y axis. As in the embodiment illustrated in FIGS. 3 and 4, the light sheet microscope 10c according to FIGS. 5 and 6 also has a moving illuminating beam 16 on the x-z plane in order, as it were, to construct a virtual light sheet.

However, in the light sheet microscope 10c of FIGS. 5 and 6, since the x scanning mirror is arranged in the beam source 14c, it does not act on the detection light 34. The latter is therefore only fed back to the y scanning mirror 20a which descans the detection light 34 in the direction of the y axis. Descanning of the detection light 34 in the direction of the x axis therefore does not take place in the light sheet microscope 10b. Accordingly, there is a flat panel detector 44c provided as for the light sheet microscope 10a shown in FIGS. 1 and 2 and in contrast to the light sheet microscope 10b shown in FIGS. 3 and 4. In contrast to the light sheet microscope 10a that also has a flat panel detector 44a, it is possible to do a line image recording by means of the flat panel detector 44c with the light sheet microscope 10c. This line-wise image recording may, for example, be realized by the flat panel detector 44c having a rolling shutter function that is synchronized with the controls of the x scanning mirror included in the beam source 14c.

Figure 8:
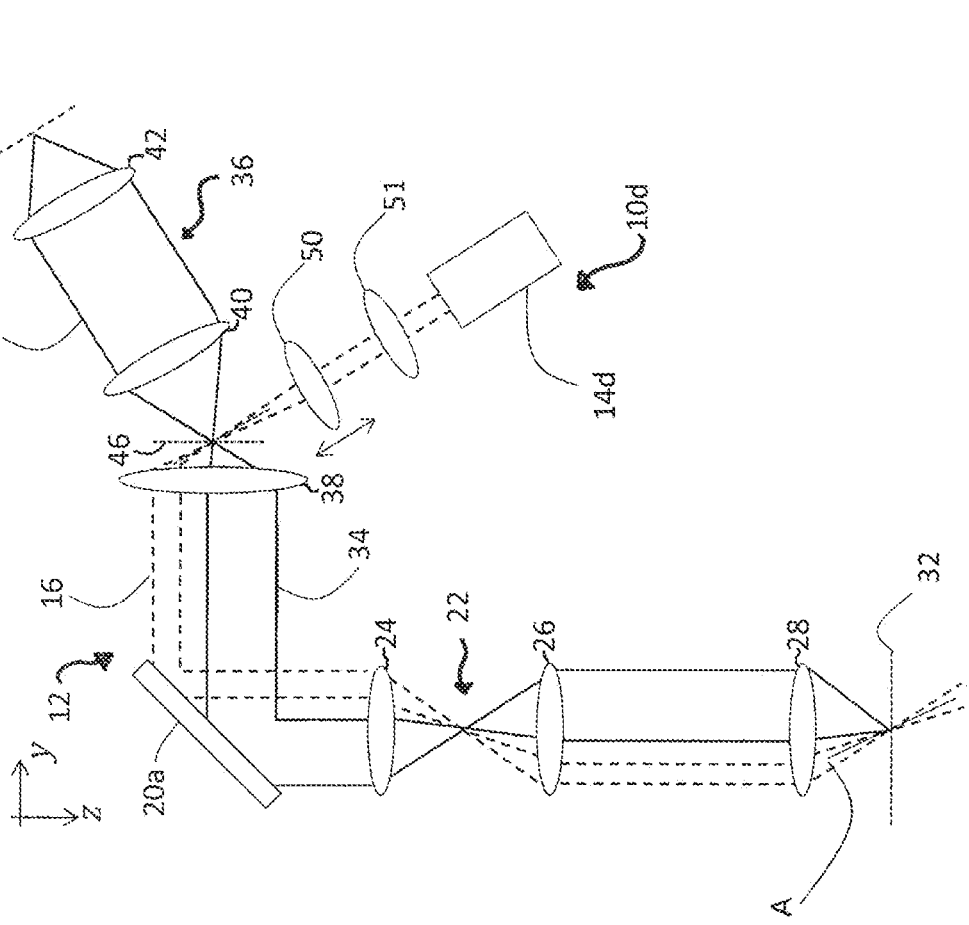
FIG. 8 the microscope according to the fourth embodiment in a x-z sectional view.

FIGS. 7 and 8 show a light sheet microscope 10d as a further embodiment in a y-z sectional view and an x-z sectional view, respectively. The light sheet microscope 10d is a modification compared to the microscope 10c illustrated in FIGS. 5 and 6. This modification consists in that the beam source 14d, which has an x scanning mirror for constructing a virtual light sheet oriented parallel to the x-z plane as in the case of the light sheet microscope 10c, emits the illuminating beam 16 onto an additional illumination objective 50 which can be moved along the optical axis of the illuminating beam path for example by means of a piezo drive, as indicated in FIG. 7 by the double arrow. The illumination objective 50 couples the illuminating beam 16 into the illuminating beam path in the region of the plane 46. As mentioned further above, the plane 46 is optically conjugated to the focus plane 32. While the illumination objective 50 is moved axially, the depth of focus area of the light sheet located in the sample 30 is shifted along the illumination plane A. Between the illumination objective 50 and the beam source 14d, there is a tube lens 51.

Apart from this, the light sheet microscope 10d mainly corresponds to the embodiments described above.

In the following, various embodiments of beam sources according to the invention are described which may be used in the light microscope arrangements and respective arrangements illustrated in FIGS. 1 to 8.

FIG. 9 shows in purely schematic representation a beam source 68 which can be used, for example, as a beam source 14a in the light sheet microscope 10a according to the FIGS. 1 and 2. In this embodiment, the beam source 68 includes a laser light source 52, a fiber coupling 54, beam shaping optics 56, and a slit aperture 64 with variable aperture opening. The beam-shaping optics 56 comprise two mutually movable lenses 58, 60, which form a beam expander, and a cylindrical lens 62. The beam-shaping optics 56 are formed on the slit aperture 64.

Between the slit aperture 64 and the illumination objective 28, any number of 4f systems can be arranged, as indicated in FIG. 9 by the two lines denoted by 65. By way of example, referring to the arrangement shown in FIGS. 1 and 2, such a 4f system can be used to map the slit aperture 64 to the y scanning mirror 20a. The y scanning mirror 20a is then imaged into the entrance pupil of the illumination objective 28 via another 4f system, which in the FIGS. 1 and 2 is formed from the optical system 22 comprising the scanning lens 24 and the tube lens 26.

The arrangement shown in FIG. 9 has all optical elements 58, 60, 62, and 28 arranged telecentrically, i.e. at a distance that is the sum of their focal lengths.

The slit aperture 64 is arranged at the focus of the cylinder lens 62 and thus on a plane that is conjugated with reference to the pupil of the objective 28. It serves to adapt the effective numeric aperture of the illuminating beam 16.

Thus, the thickness and depth of focus of the light sheet can be adjusted via the slit aperture 64.

The embodiment according to FIG. 9 is to be understood only as an example, and may be modified in various ways. It is thus possible, for example, to arrange a further slit aperture in the beam source 52 in a plane conjugate to the focal plane of the illumination objective 28. This additional slit aperture then practically serves for a lateral trimming of the light sheet and thus the adaptation of the width of the sample area illuminated by the light sheet to the width of the image field recorded by the flat panel detector 44*a*. This is meant to indicate a trimming of the light sheet in the direction of the x axis with reference to FIG. 2.

FIG. 10 in turn shows in purely schematic representation a beam source 70 which can be used, for example, as a beam source 14*c* in the light sheet microscope 10*c*, as a beam source 14*c* according to FIGS. 5 and 6, or as a beam source 10*d* in the light sheet microscope according to FIGS. 7 and 8.

Whereas the beam source 68 shown in FIG. 9 has the cylinder lens 62 for generating the light sheet, the beam source 70 according to FIG. 10 includes an x scanning mirror 72 instead of the cylindrical lens 62 for the purpose of generating a light sheet, said scanning mirror being tiltable around the y axis (with reference to FIGS. 5 to 8), as well as a scanning lens 74 that is downstream of the x scanning mirror 72. By tilting the x scanning mirror about they axis, the illuminating beam 16 is moved in the x-z plane so as to construct a virtual light sheet. The lenses 58, 60, the x scanning mirror 72 and the scanning lens 74 form beam shaping optics 75.

Figure 11:
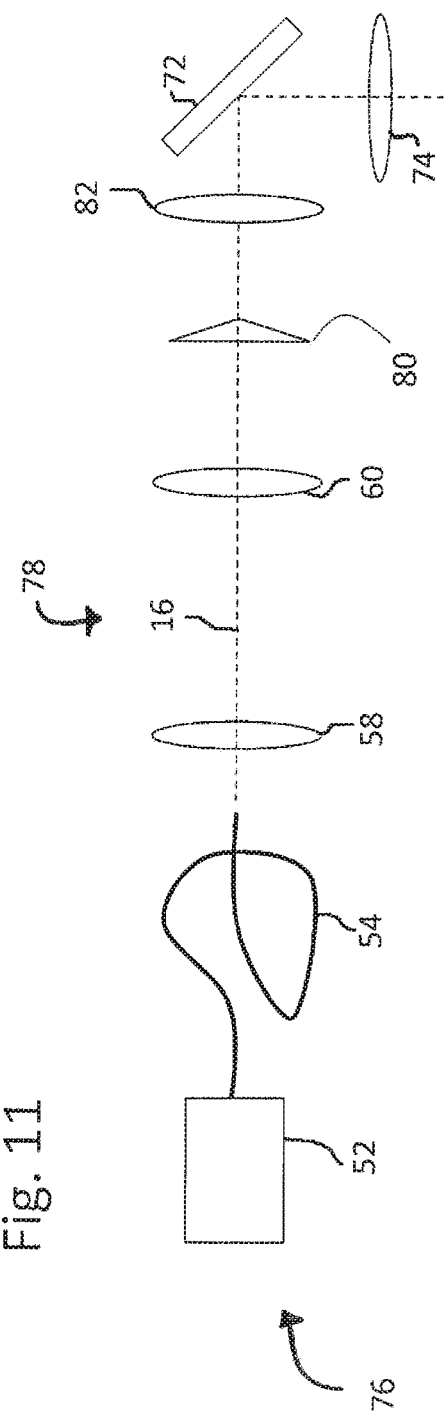
FIG. 11 a beam source according to the invention to generate a Bessel beam.

FIG. 11 shows a beam source 76 which represents a variation compared to the beam source 70 shown in FIG. 10. The beam source 76 has beam-shaping optics 78 which are designed to generate the illuminating beam 16 in the form of a Bessel beam. In addition to the beam expander formed by the two lenses 58, 60 the beam-shaping optics 78 also includes a convex axicon 80 and a further lens 82 downstream of the axicon 80. The axicon 80 may be executed as a refractive or diffractive component or as a hologram on a spatial light modulator or as a deformable mirror. The axicon 80 serves to modify the phase of the illuminating beam 16 depending on the distance from the optical axis. The functioning of the axicon 80 is illustrated in more detail in the schematic representation as per FIG. 12.

Figure 12:
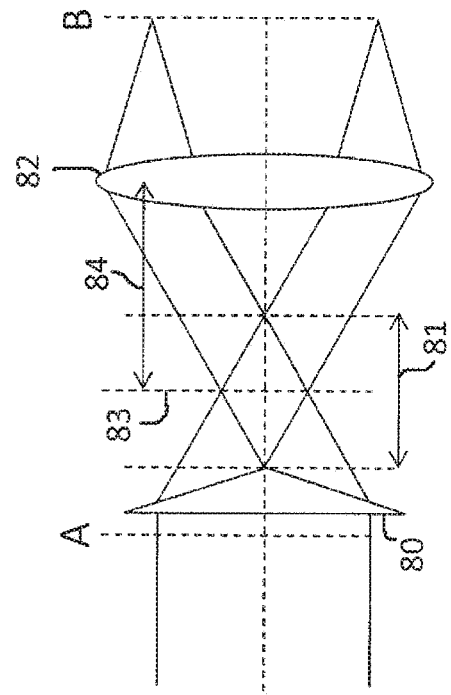
FIG. 12 a schematic illustration showing the operation of a convex axicon used in the beam source in FIG. 11.

In the representation as in FIG. 12, a double arrow 81 indicates a diamond-shaped area within which the intensity maximum of the Bessel beam generated by the axicon 80 is localized. Another double arrow 84 indicates the rear focal length of the lens 82. Accordingly, a rear focal plane 83 of the lens 82 lies in the center of the diamond-shaped region 81. This is imaged by the lens 84 in order to bring the intensity maximum of the Bessel beam into the focal plane of the illumination objective. The diamond-shaped region 81 shown in FIG. 12 thus represents the depth of focus of the Bessel beam. In order to make the axial profile of the Bessel beam symmetrically, i.e. to homogenize the beam profile, an annular orifice can be arranged on the plane indicated as B in FIG. 12.

Figure 13:
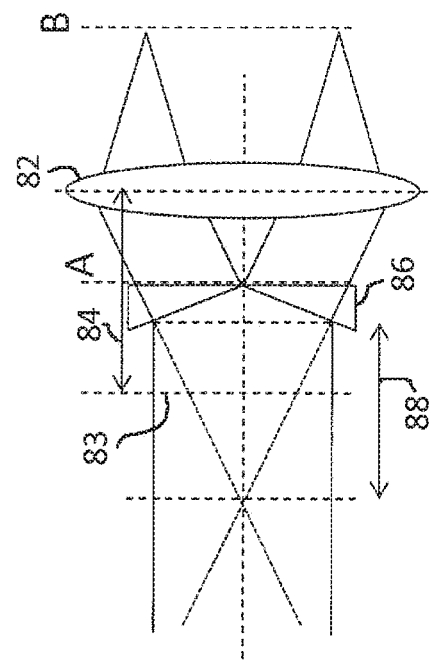
FIG. 13 a schematic illustration showing the operation of an alternatively usable concave axicon.

FIG. 13 shows an alternative embodiment in which a concave axicon 86 is used in place of the convex axicon 80. The concave axicon 86 generates a virtual Bessel beam, the intensity maximum of which lies within the range designated by 88 in FIG. 13. This is where, in turn the rear focus plane 83 of the lens 86 is located. The concave design of the axicon 86 enables a particularly space-saving arrangement.

Figure 14:
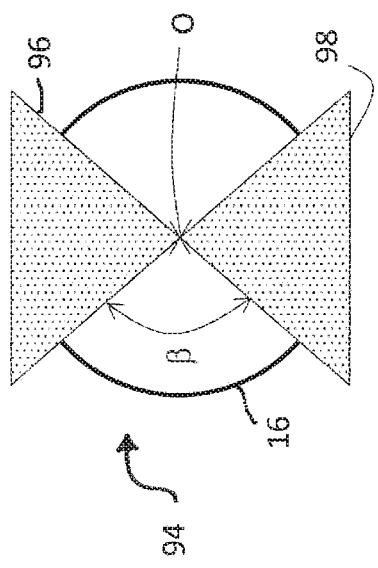
FIG. 14 a schematic diagram of an aperture assembly usable in the beam source for generating trimmed Bessel beams.
Figure 15:
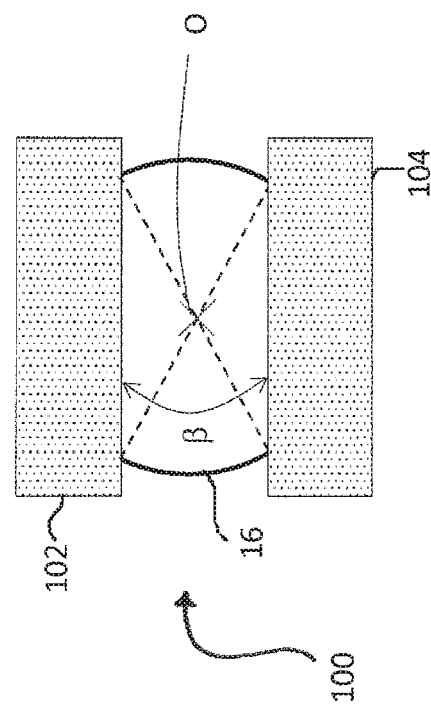
FIG. 15 a schematic illustration showing an alternative aperture assembly for generating trimmed Bessel beams.
Figure 16:
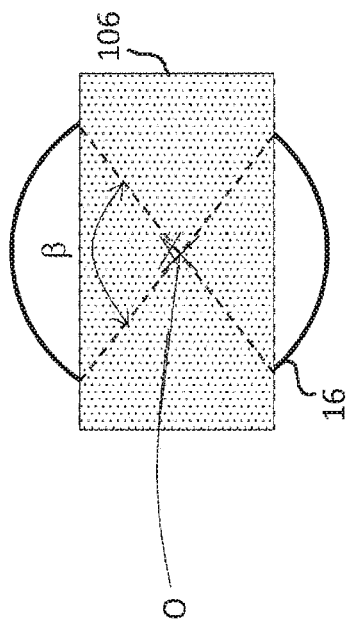
FIG. 16 a schematic illustration showing another alternative aperture arrangement for generating trimmed Bessel beams.

Different aperture arrangements are shown in FIGS. 14 to 16, which may be used in the beam source 76 of FIG. 11 in cooperation with the convex axicon 82 (see FIG. 12) or the concave axicon 86 (see FIG. 13) to produce a trimmed Bessel beam.

FIG. 14 shows an aperture 94 in a plan view of the optical axis O, wherein the aperture 94 is arranged on the plane A or the plane B according to the representations in FIG. 12 or 13. The aperture 94 is formed from two aperture elements 96 and 98, each of which has the geometrical shape of a triangle. The aperture elements 96 and 98 are facing each other in such a way that the tips of their triangle shapes are on the optical axis O in the plan view as in FIG. 14. An angle β shown in FIG. 14 is a reference for the aperture utilized by the axicons 80 and 86, respectively.

In an alternative embodiment, FIG. 15 shows a slit aperture 100 formed from two rectangular aperture elements 102 and 104. The two aperture elements 102 and 104 are arranged at a distance from one another symmetrically to the optical axis O, thus creating a gap within which the Bessel beam propagates. The angle β in turn marks the aperture used by the axicon 80 and/or 86. In each of FIGS. 12 and 13, the slit aperture 100 is configured in the arrangements shown in plane B. A trimmed Bessel beam is generated by the slit aperture 100 by means of an annular light distribution.

In another alternative embodiment, FIG. 16 shows an aperture 106 that is formed from a one-piece, rectangular aperture element arranged on the optical axis O. In this, the aperture 106 blocks the part of the light distribution formed by the Bessel beam near the axis. Accordingly, the trimmed Bessel beam is generated by a part of the light distribution that is distanced from the axis, running above and below the aperture 106 in FIG. 16. Thus, the trimmed Bessel beam again produces an annular light distribution.

The aperture 106 is configured in plane B in the arrangements according to FIGS. 12 and 13 respectively. The angle β once more indicates the aperture used by the axicon 80 and/or 86.

FIG. 17 shows a beam source 108 which, for example, can be used as a beam source 14*c* in the light sheet microscope 10*c* shown in FIGS. 5 and 6 or as a beam source 14*d* in the light sheet microscope 10*d* shown in FIGS. 7 and 8.

The beam source 108 according to FIG. 17 is designed to generate the illuminating beam 16 in the form of a Mathieu beam. For this purpose, the beam source 108 has beam-shaping optics 110 which differ from, for example, the beam-shaping optics 78 according to FIG. 11 used in the beam source 76 in that the beam expander formed from two lenses 110 and 112 is anamorphotic, i.e. has different expansions along two axes lying perpendicular to the optical axis. Consequently, the illuminating beam 16 emerging from the anamorphotic beam expander strikes the axicon 80 in the form of an elliptical Gaussian beam. This elliptical Gaussian beam is shaped into a Mathieu beam by the axicon 80, which can then be used in the way explained above to generate a light sheet.

FIG. 18 shows another beam source 114 which is designed to shift the depth of focus area of the illuminating beam 16 within the sample. To this extent, the embodiment as per FIG. 18 represents an alternative to the solution represented in FIG. 7 in which the shifting of the depth of focus area of the illuminating beam 16 occurs by means of the illumination objective 50. Whereas, therefore, the shifting of the depth of focus area occurs via a component provided outside the beam source in that version, the embodiment according to FIG. 18 realizes this technical function by means of the beam source 114 itself.

In addition to the components already explained, such as the laser light source 52, the fiber coupling 54, the y scanning mirror 72 and the scanning lens 74, the beam source 114 contains beam shaping optics 116 as well as a lens arrangement formed from three lenses 118, 120, and 122 which is arranged downstream of the beam shaping optics 116. Optionally, one of the optics exemplified in FIGS. 9 to 17 can be used as beam-shaping optics 116. In particular, the beam-shaping optics 116 can thus be designed in such a way that they form the illuminating beam 16 into a Bessel beam, a trimmed Bessel beam or a Mathieu beam. However, the beam-shaping optics 116 are not limited to the generation of the above-mentioned types of beams. In particular, the beam-shaping optics 116 can also be designed to produce a conventional Gaussian beam.

The lens arrangement downstream of the beam-shaping optics 114 is selected such that the two exterior lenses 118 and 122 are positioned along the optical axis at a distance of the sum of their apertures. This means that there is a plane between the two lenses 118 and 122 that has a distance both from the lens 118 and the lens 122 that is identical to the aperture of the respective lens 118 and/or 122. In this plane, which accordingly forms a common focal plane, is arranged the middle lens 120. The lens 120 is executed as a tunable lens, i.e. as an optical element whose optical effect can be variably adjusted. For example, the tunable lens 120 can be realized as an elastomer lens whose surface curvature can be modified by external actuation so that the aperture of the lens can be adjusted. Corresponding control of the tunable lens 120 thus allows for making the illuminating beam 16 convergent or divergent, as desired, which leads to a respective change in the depth of focus area.

With the aid of the beam source 114, the depth of focus area of the illuminating beam 16 can be controlled such that the light sheet generated within the sample can be varied in shape, extent and position. Hence, the depth of focus area of the illuminating beam is usually set in traditional arrangements in such a way that the entire image field is illuminated. This means that the depth of focus area usually corresponds to the extension of the image along the optical axis. In contrast to this, the beam source 114 illustrated in FIG. 18 can be controlled in such a way that the illuminating beam 16 focuses more strongly, i.e. a smaller depth of focus area is selected so that the resulting light sheet becomes smaller in the waist area while it diverges more strongly, i.e. becomes thicker away from the waist. Preferably, only detection light which originates from a sample strip illuminated by the waist of the light sheet is then detected on the detector side.

FIG. 19 shows a beam source 124 that represents a modified embodiment compared to the arrangement according to FIG. 18 to shift the depth of focus area of the illuminating beam 16. The beam source 124 contains a disk 128 that can be moved perpendicular to the optical axis instead of the tunable lens 120 provided in FIG. 18, said disk comprising several transparent blocks 130, 132, 134 and 136. The transparent blocks 130 to 136 feature different thicknesses along the optical axis. The disk 128 can be moved perpendicular to the optical axis by means of a corresponding drive, so that optionally one of the transparent blocks 130 to 136 is introduced into the beam course of the illuminating beam 16. Due to their various axial thicknesses, the transparent blocks 130 to 136 influence the optical path length of the illuminating beam 16 in different ways. This varying influence of the optical path length can be used to shift the depth of focus area of the illuminating beam and thus the waist of the resulting light sheet corresponding to the depth of focus area within the sample.

In the beam source 124 as in FIG. 19, the two lenses 118 and 122 are spaced apart in such a way as to form approximately a telecentric system. To be precise, the distance of the two lenses 118, 122 is selected to be slightly larger than the sum of the apertures of the lenses 118, 122. The distance is dimensioned precisely, so that in the event that a transparent medium-thickness block, e.g. the block 134 is in the beam path of the illuminating beam 16, and the illuminating beam 60 entering the lens 118 in collimated form also emerges from the lens 122 collimated. However, if one of the two thicker blocks 130, 132 is found in the beam course, the illuminating beam 16 diverges when emerging from the lens 122. In contrast, it emerges as a convergent light bundle from the lens 122 when the thinner block 136 is introduced into the beam path.

The disk 128 provided with the transparent blocks 130 to 136 is located in a region of the beam path in which the illuminating beam 16 is divergent or convergent, in any case not collimated.

The implementation to influence the optical path length of the illuminating beam 16 shown in FIG. 19 should be regarded as an example only. For example, in an appropriately modified implementation, the transparent blocks 130 and 136 may also be arranged on a disk that may be turned around the optical axis in order optionally thus to introduce one of the blocks into the beam path.

FIGS. 20 and 21 show pupil representations that illustrate the advantages of using a Bessel beam, a trimmed Bessel beam and a Mathieu beam instead of a Gaussian beam. In the example given in FIGS. 20 and 21, it is assumed that the respective illuminating beam is introduced into the lens pupil 302 while displaced along the x axis, and therefore can only illuminate a partial area of the lens pupil 302 that is off-center. This displacement in the x direction determines the tilt of the resulting light sheet plane towards the optical axis.

In FIGS. 20 and 21, those regions of the lens pupil 302 which are associated with the illumination aperture 304 and the detection aperture 306 are respectively shown for the different beam types. The pupil region defined by the illumination aperture 304 is hereinafter referred to as illumination pupil and the pupil area defined by the detection aperture 306 is referred to as detection pupil 308.

For a Bessel beam 300*a*, FIG. 20 shows how this is as placed at the edge of the lens pupil 302 in such a way that the illumination pupil and detection pupil 308 completely utilize the extension of the lens pupil 302 in the x direction. The length of the arrow indicates the maximum illumination aperture. FIG. 21 shows the same situation for a trimmed Bessel beam or a Mathieu beam 300*b*, wherein FIG. 21 also indicates the maximum illumination aperture 310 for a Gaussian beam for comparison. As can be seen from the illustration of FIG. 21, a trimmed Bessel beam or Mathieu beam 300*b* can be placed closer to the edge of the lens pupil 302 with the illumination aperture in motion. In other words, an overlap of the illumination pupil with the detection pupil can be avoided with a larger illumination aperture. As a result, a larger detection aperture or a larger illumination aperture can be used in this way.

Figure 22:
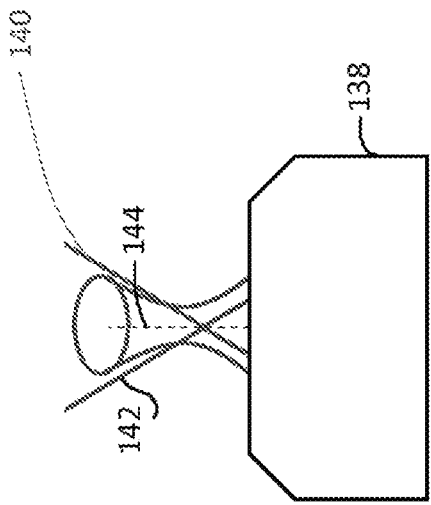
FIG. 22 a schematic sectional view that shows the overlap between the illuminating beam and a detection cone when using a Gaussian beam.
Figure 23:
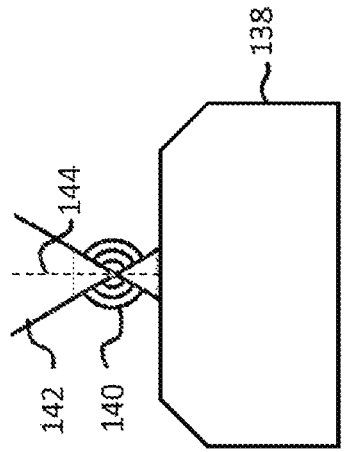
FIG. 23 the overlap between illuminating beam and detection cone using a Gaussian beam in another sectional view.
Figure 24:
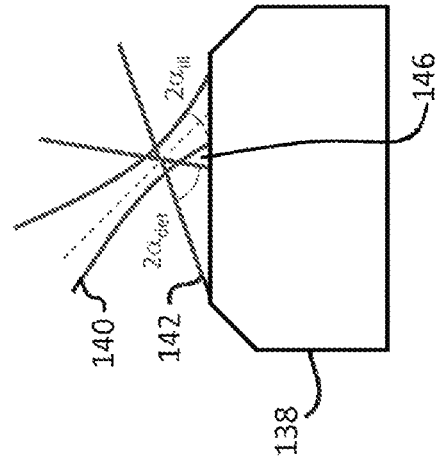
FIG. 24 a schematic sectional view showing the overlap between the illuminating beam and the detection cone using a trimmed Bessel beam or a Mathieu beam.
Figure 25:
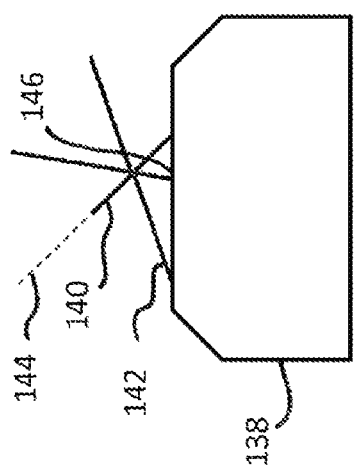
FIG. 25 the overlap between illuminating beam and detection cone using a trimmed Bessel beam or a Mathieu beam in another sectional view.

The advantage resulting from illumination with a Bessel beam, especially a trimmed Bessel beam and a Mathieu beam compared to illumination with a Gaussian beam is once again illustrated in FIGS. 22 to 25. FIGS. 22 and 23 show illumination with a Gaussian beam in two perpendicular sectional views, whereas FIGS. 24 and 25 illustrate illumination with a trimmed Bessel beam or a Mathieu beam in respective sectional views.

In FIGS. 22 to 25 are shown an objective 138, as well as the respective cross-section of an illuminating beam 140 together with a detection cone 142. The illuminating beam 140 in FIGS. 22 and 23 is a Gaussian beam, and in FIGS. 24 and 25 a trimmed Bessel beam or Mathieu beam.

The illumination is preferably selected to limit the overlap of the respective illuminating beam 140 with the detection cone 142 to as narrow an area around the plane to be imaged as possible, said plane being indicated by a dotted line marked as 144 in FIG. 22. In particular, the area in which an overlap between the illuminating beam 140 and the detection cone 142 should be avoided is indicated by the number 146 in FIGS. 22 and 25.

As an overview of FIGS. 22 to 25 shows, the aforementioned overlap between the illuminating beam 140 and the detection cone 142 is significantly less when using a trimmed Bessel beam or a Mathieu beam than when using a Gaussian beam. In this case, there is a lot more leeway to increase the detection aperture for a trimmed Bessel beam or a Mathieu beam. Furthermore, the detection aperture $NA_{det}=n\,\alpha_{det}$ is determined, wherein the aperture angle $2\alpha_{det}$ of the detection cone 142 is only indicated in FIG. 22 for the sake of simplifying the illustration. FIG. 22 also shows the angle representing a measure for the illumination aperture. The illumination and detection apertures are limited by the aperture angle of the objective α with NA=n sin α over $2\alpha=2\alpha_{ill}+2\alpha_{det}$.

Embodiments are now described which aim at compensating for losses in detection light which occur due to scattering and absorption as the penetration depth of the illuminating beam into the sample increases. Thus, in conventional microscopy, in which the illuminated plane coincides with the focus plane of the detection objective, such losses of illumination light across the image field are relatively low. On the other hand, in a light sheet microscope method such as OPM or SCAPE, the detection light for an individual image is captured from very different depths within the sample. In this case, it may be necessary to compensate for the loss of illumination light as a result of scattering and absorption, which increases with increasing light penetration depth.

FIGS. 26 to 29 illustrate in an exemplary fashion how a compensation of an attenuation of the illuminating beam 16 caused by scattering and/or absorption in relation to the light penetration depth can be obtained by means of a shift of the depth of focus area of the illuminating beam 16 as is possible by means of the arrangements shown in FIGS. 4, 18 and 19. FIG. 26 shows an objective 148 through which the sample is illuminated with the illuminating beam 16. The illuminating beam 16 has a depth of focus area 150 whose extent along the illumination axis z in FIG. 26 is indicated by a double arrow. Within the depth of focus area 150 is found the focal plane of the objective 148 indicated as 152 in FIG. 26.

FIG. 27 illustrates on one hand how the depth of focus area 150 along the illumination axis z can be shortened by improved focusing of the illuminating beam 16. Accordingly, the thickness of the illuminating beam 16 measured in the radial direction r, i.e. perpendicular to the illumination axis z, also decreases. This results in a clearly thinner light sheet with a shorter depth of focus.

FIG. 27 illustrates on the other hand how the depth of focus area 152 can be displaced along the illumination axis z in order to vary the depth of penetration in which the light sheet illuminates the sample. The region within which the depth of focus area 150 is displaced along the illumination axis z is indicated in FIG. 27 by the double arrow 151 denoted by 151.

FIG. 28 shows an example of how the axial shift of the depth of focus area 150 can be used to compensate attenuation. For this, a curve 154 indicates the intensity of the illuminating beam in relation to the time t in FIG. 28. The curve below indicated as 156 in turn indicates the position of the depth of focus area 150 along the illumination axis z in relation to the time t, wherein an increase of the curve 156 corresponds to a shift of the depth of focus area 150 in FIG. 27 from left to right.

As the course of the curve 156 in FIG. 28 shows, the depth of focus area 150 in this example is first moved from an initial position with constant speed along the illumination axis z away from the objective 148 to a final position, then returned from this end position to the initial position and then once more moved from the initial position to the end position with the same constant speed. In FIG. 27, the depth of focus area 150 is shown in the initial position with solid lines and in the end position with dotted lines.

According to the curve 154, the intensity of the illuminating beam 16 is increased while the depth of focus area 150 is moved from its initial position along the illumination axis z to its end position. In the example of FIG. 28, the intensity increases exponentially. This exponential increase in intensity mirrors the so-called Lambert-Beer's law that describes the attenuation of the intensity of electromagnetic radiation when penetrating a medium with an absorbing and/or scattering substance depending on the concentration of this substance and the penetration depth. In a simpler implementation, however, a linear increase in intensity of the illuminating beam can also be provided.

The increase, or generally the modulation along z may in particular be adapted to the object iteratively and adaptively in such a way that the signal strength is evenly aligned along z in the image. This allows the evaluation of at least one (raw) image in order to adjust the beam profile in a suitable manner and create a final optimized image that is saved for the user.

In order to adjust the intensity paths illustrated in FIGS. 28 and 29, the laser light source emitting the illuminating beam 16 is controlled over time accordingly.

FIG. 29 shows a modified exemplary embodiment for attenuation compensation. As curve 154 in FIG. 29 shows, the intensity of the illuminating beam 16 is maintained constant across the entire displacement movement of the depth of focus area 150 in this specimen embodiment. In contrast to this, the speed at which the illuminating beam 16 is moved along the illumination axis z varies. Specifically, the displacement speed decreases with increasing penetration depth. This means that the dwell time of the illuminating beam 16 increases with the penetration depth, whereby deeper sample regions are illuminated more intensely.

Figure 30:
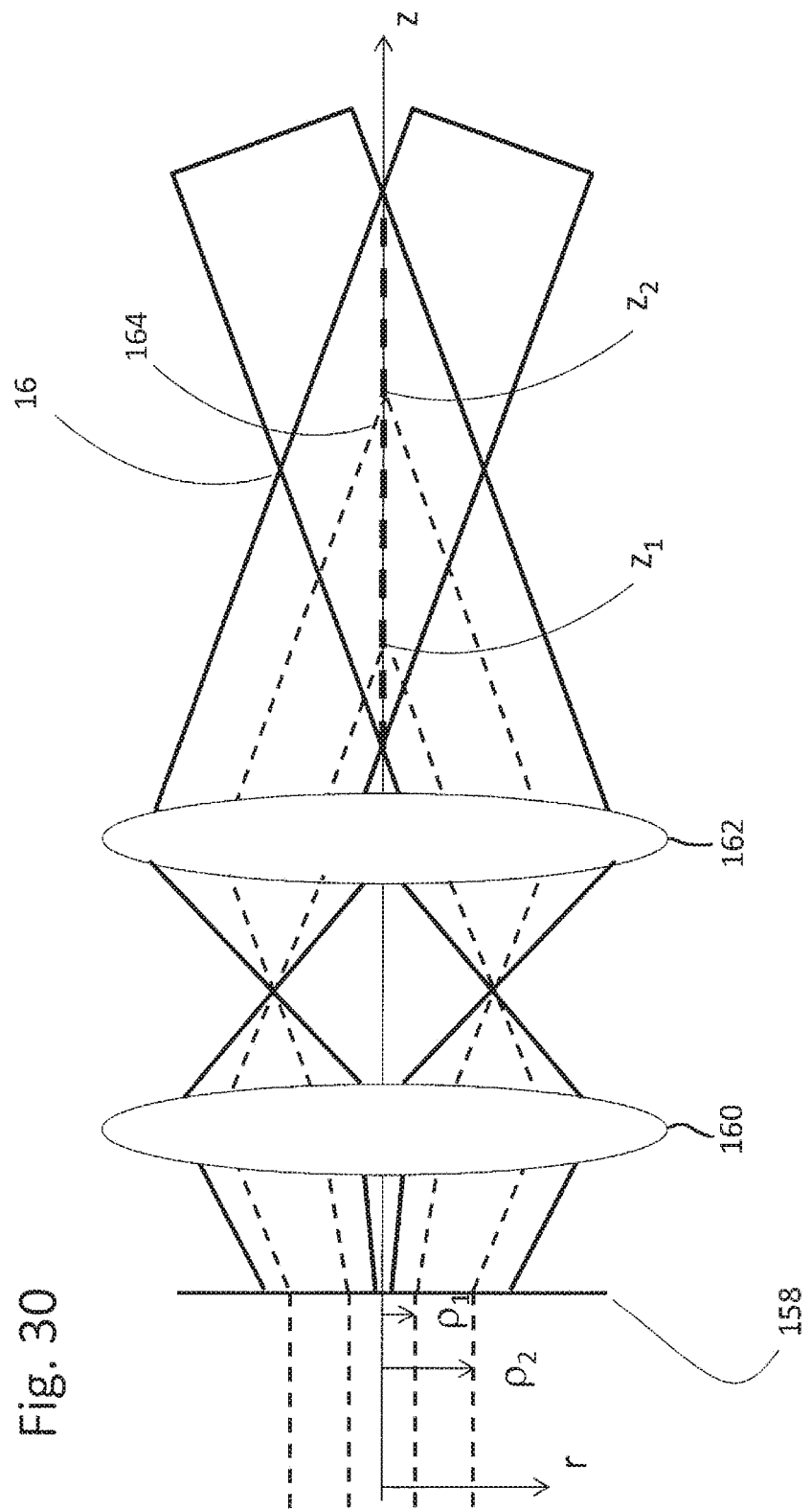
FIG. 30 a schematic representation to illustrate how the influence of the radial profile of the illuminating beam according to the invention can control the axial intensity to compensate attenuation.

FIG. 30 illustrates how the intensity along the illumination axis z for absorption compensation can be controlled by influencing the radial profile of the illuminating beam 16. In addition, a Bessel beam, a trimmed Bessel beam or a Mathieu beam is preferably used as illuminating beam 16. For generating the desired beam shape, for example, a convex axicon may be positioned in a plane 158. As shown in FIG. 30, downstream of this plane 158 there are a lens 160 as well as an objective 162. Any number of telecentric optics and means of beam deviation can be arranged between the lens 160 and the objective 162.

In order to influence the radial profile of the illuminating beam 16, a suitable means, for example a mask provided with ring segments of different transmission, can be used to vary the transmission of the illuminating beam 16 as a function of the radial distance r from the illumination axis z such that the intensity of the illuminating beam 16 along the illumination axis z is adjusted in the desired manner. If transmission is, for example, selected in such a way that at a radial distance ρ1, to which is assigned a position z2 on the illumination axis z, it is greater than in case of a greater radial distance ρ2 to which is assigned a position z1 on the illumination axis, then the intensity of the illuminating beam 16 in the axial position z2 can be increased compared to the intensity in position z1. Diffraction effects are to be taken into account as well as the fact that a ring with a ring width dρ has an area A=2 πρ dρ, which thus increases with ρ. For an even intensity of the illuminating beam on the optical axis, the transmission of the ring segments therefore has to decrease as it moves to the exterior. Taking into account the light loss occurring due to scattering and/or absorption, the radial profile of the illuminating beam can thus be adjusted by means of an appropriate transmission control mask so that the axial intensity of the illuminating beam 16 along the illumination axis z increases to just such an extent that the light losses increasing with the penetration depth are compensated.

The illumination illustrated in FIG. 30 by means of a Bessel beam, a trimmed Bessel beam or a Mathieu beam is particularly useful in connection with confocal line detection.

FIG. 31 shows a beam source 168 by means of which the illumination principle illustrated in FIG. 30 is implemented by way of example. In addition to the laser light source 52, the fiber coupling 54 and the beam expander formed from the two lenses 58, 60, the beam source 168 as in FIG. 31 also features the lens 160 also shown in FIG. 30 as well as a spatial light modulator 170 by which is realized the axicon mentioned above with reference to FIG. 30 together with the mask controlling the radial beam profile. Instead of the spatial light modulator 170, a free-form lens whose curvature radius varies with the radial distance r in order to adjust the axial intensity of the illuminating beam 16 as desired can also be used.

FIG. 32 shows a beam source 172 that is a modified embodiment for realization of the illumination principle illustrated in FIG. 30 compared to the arrangement as in FIG. 31. The beam source 172 has two spatial light modulators 174 and 176, of which the first light modulator 174 serves to generate a suitable illumination for an axially increasing beam profile on the second light modulator 176. In this case, the first light modulator 174 modulates the phase of the illuminating beam such that the amplitude of the illuminating beam 16 on the second spatial light modulator varies as desired as a function of the radial distance from the illumination axis. The second spatial light modulator 176 that is between the lens 160 and the objective 162 with reference to FIG. 30 is shaped once again, for example, by an axicon. Starting from the second light modulator 176, the illuminating beam 16 propagates, for example, via a scanning mirror to the illumination objective.

FIG. 33 shows a beam source 178 which is modified in contrast to the embodiment depicted in FIG. 32 in that, instead of the two separate light modulators 174, 176, a single spatial light modulator 178 is provided which has two modulator regions 180 and 182 of which the first modulator section 180 assumes the function of the first light modulator 174 and the second modulator section 182 assumes the function of the second light modulator 176.

The illuminating beam 16 first strikes the first modulator section 180, then passes through the lens 160 and is reflected on the mirror 184 in the direction of the second modulator section. Starting from the second modulator section 182, the illuminating beam 16 propagates to a further mirror 186 which reflects the illuminating beam 16 e.g. via a scanning mirror in the direction of the illumination objective.

FIGS. 34 and 35 show an embodiment in which a flat panel detector 188 with rolling shutter function is used. FIG. 34 shows the arrangement in an x-y sectional view and FIG. 35 in a y-z sectional view. In the embodiment as in FIGS. 34 and 35, separate objectives are provided for illumination and detection, namely an illumination objective 190 focusing the illuminating beam 16 into the sample and a detection objective 192 arranged with its optical axis at right angles to the optical axis of the illumination objective 190. The arrangement shown in FIGS. 34 and 35 further comprises a device unit 194 downstream of the detection objective 192 and a tube lens 196 upstream of the flat panel detector 188.

In the embodiment according to FIGS. 34 and 35, the illuminating beam 16 is moved transversely to the illumination axis z along the x axis. Accordingly, the sample is illuminated along a strip running in the direction of the z axis which is moved contrary along the x axis. Consequently, the detection light 34 generates a corresponding strip on the flat panel detector 188 which falls in the direction of the z axis and moves along the x axis across the flat panel detector 188.

The flat panel detector 188 has a rolling shutter function, i.e. it is designed in such a way that at a given time, there is only one respective strip-shaped area 198 of the flat panel detector 188 running in the direction of the z axis that is switched active and therefore effective for detection. The surface detector 188 is driven so that its actively switched strip-shaped area 198 is moved along the x axis synchronously with the detection light strip falling on the flat panel detector 188.

The flat panel detector 188 can be controlled in such a way that its strip-shaped area 198 implementing the rolling shutter function has a width of just a single pixel in the direction of the x axis. In this case, the flat panel detector 188 acts as a line detector (moving in the x-axis direction). In order to obtain an improved detection light effect, the strip-shaped area 198 of the flat panel detector 188 may also have a width of several pixels in the direction of the x axis. In any case, the strip-shaped region 198 of the surface detector 188 can advantageously be used in the manner of a slit aperture in order to realize line-by-line detection. The width, i.e. the number of lines switched to active at the same time, may ideally be selected freely.

In one particularly preferred embodiment, the illuminating beam used in the arrangement of FIGS. 34 and 35 is a Bessel beam, a trimmed Bessel beam or a Mathieu beam. By means of such a beam, that may be generated by one of the beam sources described above, the area adjacent to the illumination axis may, as it were, be used to feed the illumination axis z with light as in, for example, one of the solutions shown in FIGS. 30 to 33, which is not possible with a Gaussian beam. The latter has a narrow angular spectrum, which is necessary for a high depth of focus. In contrast, for example, a Bessel beam has contributions with higher radial components in the angular spectrum. The strip-shaped area of the flat panel detector 188 in this case corresponds, for example, with the line 164 indicated in FIG. 30. It is therefore in a plane conjugated with respect to the sensor, in a position along the x axis that is imaged to the region 198.

FIGS. 36 and 37 show a modified embodiment in an x-y sectional view and/or a y-z sectional view, also with a rolling shutter function used with a flat panel detector 200. In contrast to the embodiments illustrated in FIGS. 34 and 35, the illuminating beam 16 is produced here with a high numerical aperture and a low depth of focus. In this respect, a kind of illumination can be used for this embodiment as has been described in an exemplary fashion above in the description of FIGS. 26 to 29.

In the arrangement illustrated in FIGS. 36 and 37, the illuminating beam 16 is focused in such a way that it is comparably short in the direction of the illumination axis z. In this case, the waist of the illuminating beam 16 in the direction of the y axis, which represents the detection axis, is then comparatively thin.

The sample area illuminated with the illuminating beam 16 is imaged onto the flat panel detector 200 in the shape of an elongated strip in the x direction. By moving the illuminating beam 16 along the z axis, the detection light strip thus moves along the z axis on the flat panel detector 200 in the opposite direction. Accordingly, the flat panel detector 200 is controlled in such a way that at a given time, only a strip-shaped area 202 of the flat panel detector 200 that runs along the x axis and has a width of one or several pixels in the direction of the z axis is switched to active and is therefore effective for detection. This strip-shaped area 202 of the flat panel detector 200 is moved synchronously to the movement of the illuminating beam 16 along the z axis to realize the rolling shutter function.

All of the above specimen embodiments are only intended as an exemplary description of beam-modulation means according to the invention. It should in particular be noted that the means for beam modulation described above are not limited to those embodiments to which concrete reference is made in the description of those means. Accordingly, every means may also be combined with other embodiments. The various beam-modulation means can themselves be combined with one another as required. For example, it is possible to combine a beam modulation that is realized by shifting the depth of focus area of the illuminating beam, with beam modulation that is achieved by controlling the beam cross-section by means of one of the beams shaping optics described above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light sheet microscope, comprising:
an illuminator having a beam source which is designed to direct an illuminating beam propagating along an illumination axis onto a sample;
a light-sheet generator which is designed to generate a light-sheet-type illuminating light distribution illuminating the sample in one partial region;
a detection unit having a detector that is designed to capture detection light originating from the section of the sample that is illuminated by the illuminating light distribution; and
an objective provided for both the illuminator and the detection unit such that a pupil of the objective is to be penetrated by the illuminating beam and the detection light with the illuminating beam penetrating in a region of the pupil which is shifted from a center of the pupil,
wherein the illuminator has a beam modulator designed to modulate the illuminating beam perpendicular to the illumination axis.

2. The light sheet microscope according to claim 1, wherein the beam modulator is designed as beam shaping optics which are designed to shape the illuminating beam in such a way that a radial intensity profile of the illuminating beam has at least one profile section in at least one direction perpendicular to the illumination axis that rises with increasing radial distance from the illumination axis.

3. The light sheet microscope according to claim 2, wherein the beam shaping optics are designed to shape an increasing or decreasing phase from the illuminating beam that is directly proportional to the radial distance from the illumination axis.

4. The light sheet microscope according to claim 2, wherein the beam shaping optics contain an aperture arrangement which is designed to trim the beam cross-section of the illuminating beam.

5. The light sheet microscope according to claim 2, wherein the beam shaping optics include at least one spatial light modulator that is designed to generate the radial intensity profile of the illuminating beam.

6. The light sheet microscope according to claim 1, wherein the beam modulator is additionally designed to modulate the illuminating beam along the illumination axis.

7. The light sheet microscope according to claim 6, wherein the beam modulator is designed to shift a depth of focus area of the illuminating beam along the illumination axis.

8. The light sheet microscope according to claim 6, wherein the beam modulator is designed to modulate the illuminating beam along the illumination axis in such a way that the exposure of the partial region of the sample illuminated with the illuminating light distribution does not decrease along the illumination axis.

9. The light sheet microscope according to claim 1, wherein the beam source includes anamorphotic optics as the light-sheet generator.

10. The light sheet microscope according to claim 1, wherein the beam source includes a first scanning element as the light-sheet generator, and wherein the first scanning element is designed to move the illuminating beam along a first scanning axis.

11. The light sheet microscope according to claim 10, further comprising a second scanning element provided jointly for the illuminator and the detection unit that is designed to move the illuminating beam along a second scanning axis that is perpendicular to the first scanning axis.

12. The light sheet microscope according to claim 11, wherein the detector is a flat panel detector.

13. The light sheet microscope according to claim 12, wherein the flat panel detector includes a plurality of sensor elements that are controllable in such a way that at a given time only some of the sensor elements are switched to be active to enable a movable shutter function.

14. The light sheet microscope according to claim 1, further comprising a scanner which is provided jointly for the illuminator and the detection unit and is designed to move the illuminating beam along a first scanning axis and along a second scanning axis which is perpendicular to the first scanning axis.

15. The light sheet microscope according to claim 14, wherein the detector is a line detector.

16. A method for microscopic imaging of a sample, the method comprising:
   directing an illuminating beam propagating along an illumination axis onto the sample;
   generating a light-sheet-type illuminating light distribution illuminating the sample in one partial region from the illuminating beam; and
   capturing detection light originating from the partial region of the sample illuminated by the illuminating light distribution,
   wherein the illuminating beam and detection light are conducted through a pupil of an objective jointly arranged for the illuminating unit and the detection unit with the illuminating beam penetrating in a region of the pupil which is shifted from a center of the pupil, and
   wherein the illuminating beam is modulated perpendicular to the illumination axis.

17. The method according to claim 16, wherein the illuminating light distribution is used for a non-linear fluorescence excitation of the sample.

18. The method according to claim 16, wherein the illuminating beam is modulated perpendicular to the illumination axis by a beam modulator, the method further comprising modulating, by the beam modulator, the illuminating beam along the illumination axis.

19. A light sheet microscope, comprising:
   an illuminator having a beam source which is designed to direct an illuminating beam propagating along an illumination axis onto a sample;
   a light-sheet generator which is designed to generate a light-sheet-type illuminating light distribution illuminating the sample in one partial region;
   a detection unit having a detector that is designed to capture detection light originating from the section of the sample that is illuminated by the illuminating light distribution; and
   an objective provided for both the illuminator and the detection unit such that the objective is to be penetrated by the illuminating beam and the detection light,
   wherein the illuminator has a beam modulator designed to modulate the illuminating beam perpendicular to the illumination axis and along the illumination axis.

20. The light sheet microscope according to claim 19, wherein the beam modulator is designed to shift a depth of focus area of the illuminating beam along the illumination axis.

21. The light sheet microscope according to claim 19, wherein the beam modulator is designed to modulate the illuminating beam along the illumination axis in such a way that the exposure of the partial region of the sample illuminated with the illuminating light distribution does not decrease along the illumination axis.

22. The light sheet microscope according to claim 1, wherein the beam modulator includes beam shaping optics which contain an aperture arrangement which is designed to trim the beam cross-section of the illuminating beam.

23. A method for microscopic imaging of a sample, the method comprising:
   directing an illuminating beam propagating along an illumination axis onto the sample;
   generating a light-sheet-type illuminating light distribution illuminating the sample in one partial region from the illuminating beam;
   modulating the illuminating beam perpendicular to the illumination axis;
   modulating the illuminating beam along the illumination axis; and
   capturing detection light originating from the partial region of the sample illuminated by the illuminating light distribution,
   wherein the illuminating beam and detection light are conducted through an objective jointly arranged for the illuminating unit and the detection unit.

* * * * *